(12) United States Patent
Makino et al.

(10) Patent No.: US 7,441,883 B2
(45) Date of Patent: Oct. 28, 2008

(54) PRODUCTION PROCESS OF INKJET INK COMPOSITION AND INKJET COMPOSITION

(75) Inventors: Naonori Makino, Shizuoka (JP); Miki Takahashi, Shizuoka (JP); Yuuichi Hayata, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 385 days.

(21) Appl. No.: 11/300,285

(22) Filed: Dec. 15, 2005

(65) Prior Publication Data

US 2006/0139427 A1    Jun. 29, 2006

(30) Foreign Application Priority Data

Dec. 27, 2004    (JP)    ............................ P.2004-376981

(51) Int. Cl.
*G01D 11/00*    (2006.01)
(52) U.S. Cl. ........................................ 347/100; 347/95

(58) Field of Classification Search ................. 347/100, 347/95, 96, 101; 106/31.6, 31.13; 523/160
See application file for complete search history.

(56) References Cited

U.S. PATENT DOCUMENTS

2003/0220418 A1    11/2003    Horie et al.
2004/0006159 A1    1/2004    Horie et al.

FOREIGN PATENT DOCUMENTS

| EP | 1 367 101 A1 | 12/2003 |
|---|---|---|
| EP | 1 493 783 A1 | 1/2005 |
| JP | 9-193389 A | 7/1997 |
| JP | 10-138493 A | 5/1998 |

*Primary Examiner*—Manish S Shah
(74) *Attorney, Agent, or Firm*—Sughrue Mion, PLLC

(57) ABSTRACT

A process for producing an inkjet ink composition is provided and includes dispersion-treating a coloring material in a non-aqueous solvent with a dispersant having no coloring material-dispersing property, the coloring material being covered with a resin insoluble in the non-aqueous solvent. An inkjet ink composition produced by the production process is provided.

7 Claims, 3 Drawing Sheets

PRODUCTION PROCESS OF INKJET INK COMPOSITION AND INKJET COMPOSITION

TECHNICAL FIELD OF THE INVENTION

The present invention relates to a production process of an inkjet ink composition for forming a letter or an image on a transfer medium such as recording paper, and an inkjet ink composition. More specifically, the present invention relates to a production process of an inkjet ink composition enabling high-speed and stable printing of dots with high density and less blurring, and an inkjet ink composition.

BACKGROUND OF THE INVENTION

An inkjet recording method of flying an ink on a recording medium to form a recording dot, thereby performing printing, is attracting attention as a non-impact recording method assured of easy colorization and capable of direct recording on plain paper, and various printers employing this system are put into practice. The inkjet recording method includes an on-demand (on-demand ejection) system and a continuous (continuous ejection) system and these are described, for example, in publications such as Takeshi Agui, et al. (*Real Color Hard Copy*, Sangyo Tosho (1993)), Shin Ohno (*Non-impact Printing—Technology and Material—*, CMC (1986)) and Takeshi Amari (*Inkjet Printers—Technology and Material—*, CMC (1998)).

Furthermore, there are known recording systems called an electrostatic system (Sweet type and Hertz type) for the continuous type, and a piezoelectric system, a shear mode piezoelectric system and a thermal inkjet system for the on-demand type. With respect to the on-demand type inkjet recording method, one known method is a system called an electrostatic acceleration-type inkjet or slit-jet system and this system is described, for example, Susumu Ichinose and Yuji Ohba (*IEICE Transaction*, J66-C, No. 1, page 47 (1983)) and Tadayoshi Ohno and Mamoru Mizuguchi (*The Journal of the Institute of Image Electronics Engineers of Japan*, Vol. 10, No. 3, page 157 (1981)). In this system, a voltage is applied to a plurality of recording electrodes disposed to oppose a recording medium and also applied to a counter electrode provided behind the recording medium and due to potential difference generated between both electrodes, an electrostatic force is caused to act on the ink supplied on the recording electrode, as a result, the ink is flown onto the recording medium. Specific embodiments thereof are disclosed, for example, in JP-A-56-170, JP-A-56-4467 and JP-A-57-151374. These are a system in which a long and narrow slit-like ink ejection port having many recording electrodes in the inner wall is used in place of the nozzles in a conventional inkjet head and in which an ink is supplied to the slit-like ink chamber and a high voltage is selectively applied to these electrodes, whereby the ink in the vicinity of the electrode is jetted to the recording paper closely opposing the slit-like head.

Accordingly, clogging of ink less occurs, reduction in the production cost is promised by virtue of the simple head structure, and this method is effective also for realizing a so-called long line head having a length long enough to cover a wide range of a recording medium in the cross direction.

One example of the drop-on-demand type full-color recording head constituted by such an electrostatic acceleration-type inkjet recording system is disclosed, for example, in JP-B-60-59569 and *IEICE Transaction*, J68-C, No. 2, pp. 93-100 (1985).

However, the oil-based ink used therein has a small surface tension as compared with an aqueous ink commonly used in other inkjet systems and therefore, this ink exhibits very high permeability into the recording paper. Particularly, in the case of printing a letter or an image on plain paper, reduction in the printing density, blurring or strike-through is liable to occur.

An electrostatic system of coloring material concentration-ejection type using no slit-like recording head is disclosed in JP-A-9-193389 and JP-A-10-138493. In this system, a plurality of electrodes for causing an electrostatic force to act on a coloring material component in the ink each is constituted by a control electrode substrate and a convex ink guide, the control electrode substrate comprising an insulating plate having formed therein a through-hole and a control electrode formed correspondingly to the through-hole, and the convex ink guide being disposed nearly in the center position of the through-hole, an ink is carried on the surface of the convex ink guide and transferred to an ink droplet-flying position by a surface tension, and a prescribed voltage is applied to the control electrode to fly an ink droplet on a recording medium, thereby performing recording.

This electrostatic inkjet recording system of coloring material concentration-ejection type is a system of concentrating coloring material particles to an ejection port by electrophoresis and flying an ink droplet in the state of the coloring material being concentrated to a high concentration. In this way, unlike the above-described system of flying an ink droplet still containing a large amount of a liquid component to allow for uniform dispersion of the ink-constituting components, the ink droplet is ejected in the state that the coloring material particles are aggregated and the liquid component content is small, and therefore, the above-described problems are overcome. In addition, a pigment is used as the coloring material, so that advantageous results can be obtained with respect to water resistance and light fastness of the printed image as compared with a conventional inkjet head using a dye.

For obtaining high printing density and good printing property free from blurring or strike-through in such an electrostatic inkjet system of coloring material concentration-ejection type, it is first required that the ink has a sufficiently large volume resistivity. By satisfying this requirement, an electric field formed by the recording electrode and the counter electrode and applied to the ink can be made to reach the color material particles. If the volume resistivity of the ink is low, the ink is subjected to charge injection by a voltage applied from the recording electrode and is electrically charged, as a result, the ink still containing a large amount of a liquid component is more likely to be ejected due to an electrostatic repulsive force. Secondly, since the coloring material particles need to be concentrated to the ejection port at a sufficiently high speed by electrophoresis, it is required that the coloring material particle is electrically charged to a satisfactory level, that is, the coloring material particle has a positive or negative high particle electric conductivity.

In recent years, with increased demand for high speed processing of printer and high image quality, the coloring material concentration-ejection type ink head is also required to develop a technique of printing a highly refined image at a high speed by ejecting a fine ink droplet comprising a coloring material concentrated to a high concentration in a stable and high-speed manner for a long period of time.

Such printing performance has been confirmed to greatly depend on the physical properties of ink and in order to obtain satisfactory printing performance, as described above, the ink must be produced by imparting a high particle electric conductivity of 100 pS/cm or more to the coloring material particle while maintaining a high volume resistivity of preferably $10^8$ $\Omega \cdot cm$ or more. If the particle electric conductivity of the coloring material particle is less than 100 pS/cm, the coloring material particles cannot be transferred to the ejection port, that is, the distal end of the ejection electrode, at a high speed by electrophoresis and the supply of coloring material particles becomes insufficient, as a result, the aggregating property of the coloring material particles is worsened and the ejection response frequency decreases.

Furthermore, the repulsive force between the ejection electrode surface and the coloring material particle is weak and therefore, the coloring material particles sometimes adhere and deposit on the ejection electrode, giving rise to failure in stable ejection. From these reasons, there arises a problem that a sufficiently high printing density cannot be obtained and printing cannot be stably performed at a high speed.

The coloring material particle preferably comprises a coloring material such as pigment and a resin. The resin for covering the coloring material is generally desired to have properties such as (1) to form a coloring material mixture by thoroughly covering the pigment surface and keep an appropriate fluidity by the effect of heat or the like, (2) to sufficiently disperse the coloring material particles by covering the coloring material, (3) to be transparent as much as possible, and (4) to be fixed on a recording medium by fixing and thereby impart a sufficiently high scratch resistance. In the case of the electrostatic inkjet ink described above, it is additionally desired (5) to impart a positive or negative high particle electric conductivity to the coloring material particle. The coloring material particle comprising a coloring material covered with a resin can be formed by covering a coloring material with a resin to form a colored mixture, and dispersing the colored mixture in a non-aqueous solvent. However, the ordinary dispersion technique actually allows for production of a coarse particulate coloring material particle or a fine particulate coloring material particle of 0.2 μm or less and can hardly provide a dispersion of coloring material particles having a uniform particle diameter with an average particle diameter of approximately from 0.3 to 4 μm, in which the number of microfine coloring material particles of 0.2 μm or less is small.

SUMMARY OF THE INVENTION

An object of an illustrative, non-limiting embodiment of the present invention is to provide an inkjet ink composition in which a pigment is uniformly dispersed in the form of fine particles and a microfine particle of the pigment alone is not present, and to provide a production process of the same.

Another object of an illustrative, non-limiting embodiment of the present invention is to provide an inkjet ink composition in which a pigment is uniformly dispersed in the form of fine particles and a microfine particle of the pigment alone is not present, whereby easy control of electric charge, excellent aging stability, excellent ejection property at a low voltage and a high frequency, and excellent ejection stability free from adhesion of pigment particles and clogging in the inkjet recording apparatus such as nozzle part and pipeline part are ensured.

As a result of intensive investigations to solve the above-described problems, the present inventors have found that these objects can be attained by the following constitutions. That is, the invention is as follows.

(1) A process for producing an inkjet ink composition, which comprises dispersing a coloring material in a non-aqueous solvent with a dispersant having no coloring material-dispersing property, the coloring material being covered with a resin insoluble in the non-aqueous solvent.

(2) The process for producing an inkjet ink composition as described in (1) above, wherein the dispersing treatment is performed at a temperature higher than a glass transition point of the resin insoluble in the non-aqueous solvent.

(3) The process for producing an inkjet ink composition as described in (1) or (2) above, wherein the dispersant is a graft polymer containing in the main chain a repeating unit represented by formula (1):

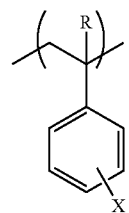

wherein R represents a hydrogen atom or a methyl group; X represents an alkyl group having a carbon number of 1 to 10, a halogen atom; —$OR^1$, —$COOR^1$ or —$CON(R^1)(R^2)$, $R^1$ represents an organic group having a carbon number of 1 to 10; and $R^2$ represents a hydrogen atom or an organic group having a carbon number of 1 to 10.

(4) An inkjet ink composition comprising: a non-aqueous solvent; a coloring material covered with a resin insoluble in the non-aqueous solvent; and a dispersant having no coloring material-dispersing property.

(5) The inkjet ink composition as described in (4) above, wherein the dispersant having no coloring material-dispersing property is a graft polymer containing in the main chain a repeating unit represented by formula (1).

According to the present invention, a pigment is uniformly dispersed in the form of fine particles and a microfine particle of the pigment alone is not present, so that an electrostatic inkjet ink composition assured of easy control of electric charge and excellent aging stability, an electrostatic inkjet ink composition assured of excellent ejection property at a low voltage and a high frequency, and an electrostatic inkjet ink composition assured of excellent ejection stability free from adhesion of pigment particles in the inkjet recording apparatus such as nozzle part and pipeline part, can be provided.

Figure 1:
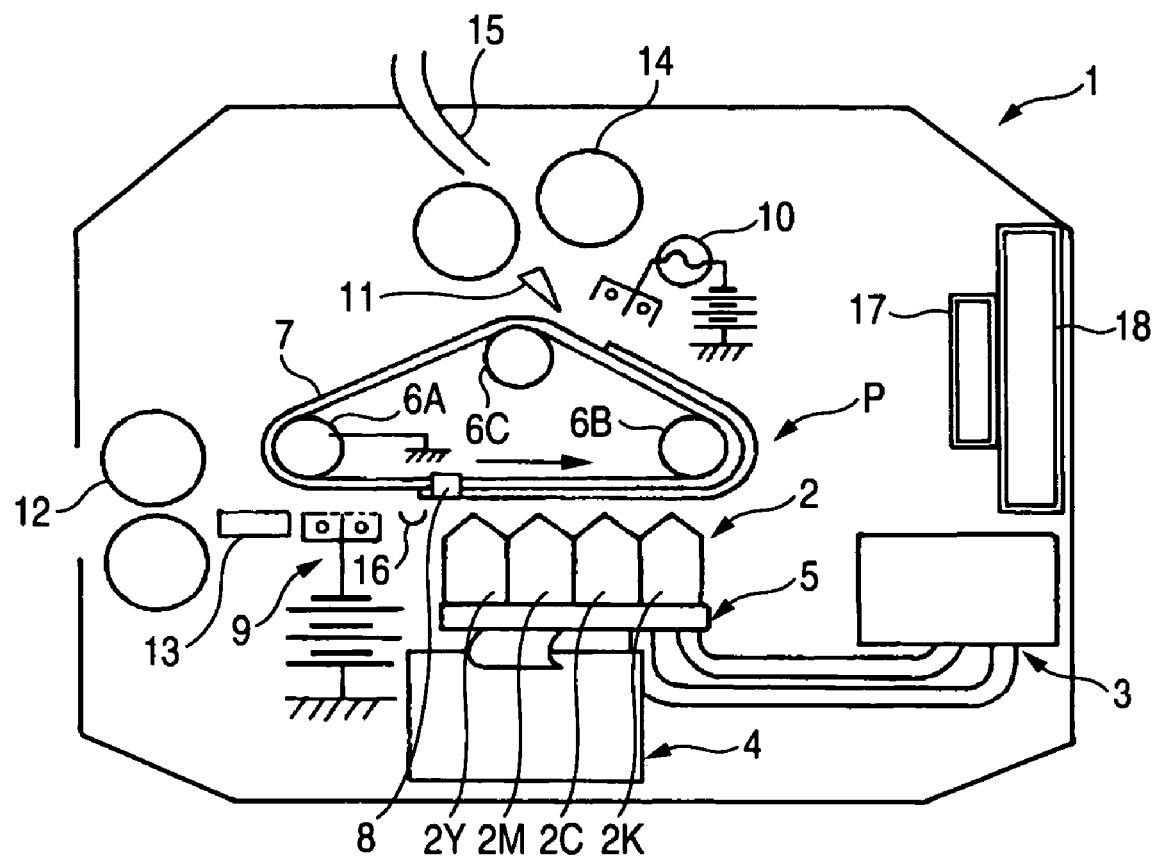
FIG. 1 is an entire constitutional view schematically showing an illustrative, non-limiting embodiment of the inkjet printing apparatus for use in the present invention.
Figure 2:
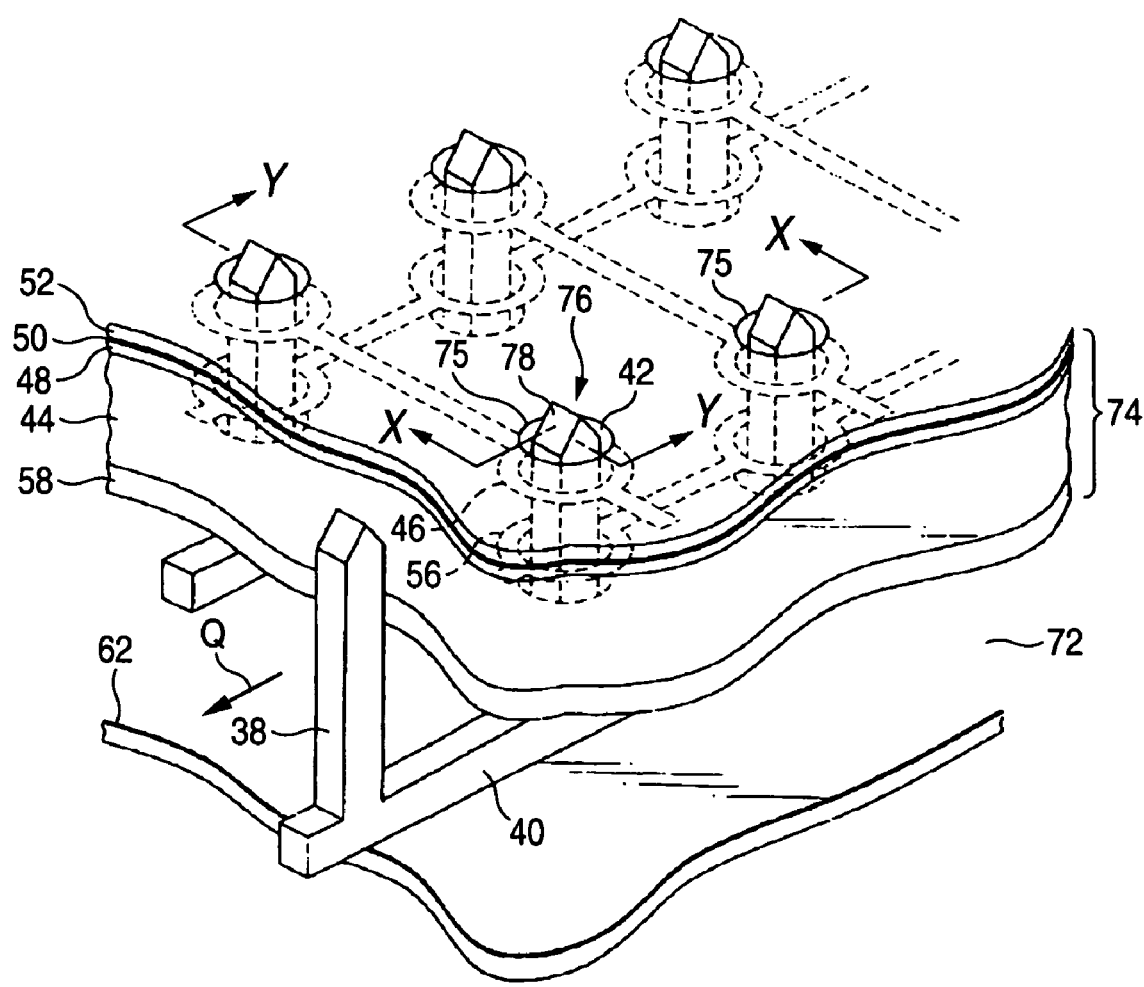
FIG. 2 is a perspective view showing the constitution of an illustrative, non-limiting of the inkjet head of the inkjet recording apparatus for use in the present invention (for clearly showing the constitution, the edge of the guard electrode in each ejection part is not drawn).
Figure 3:
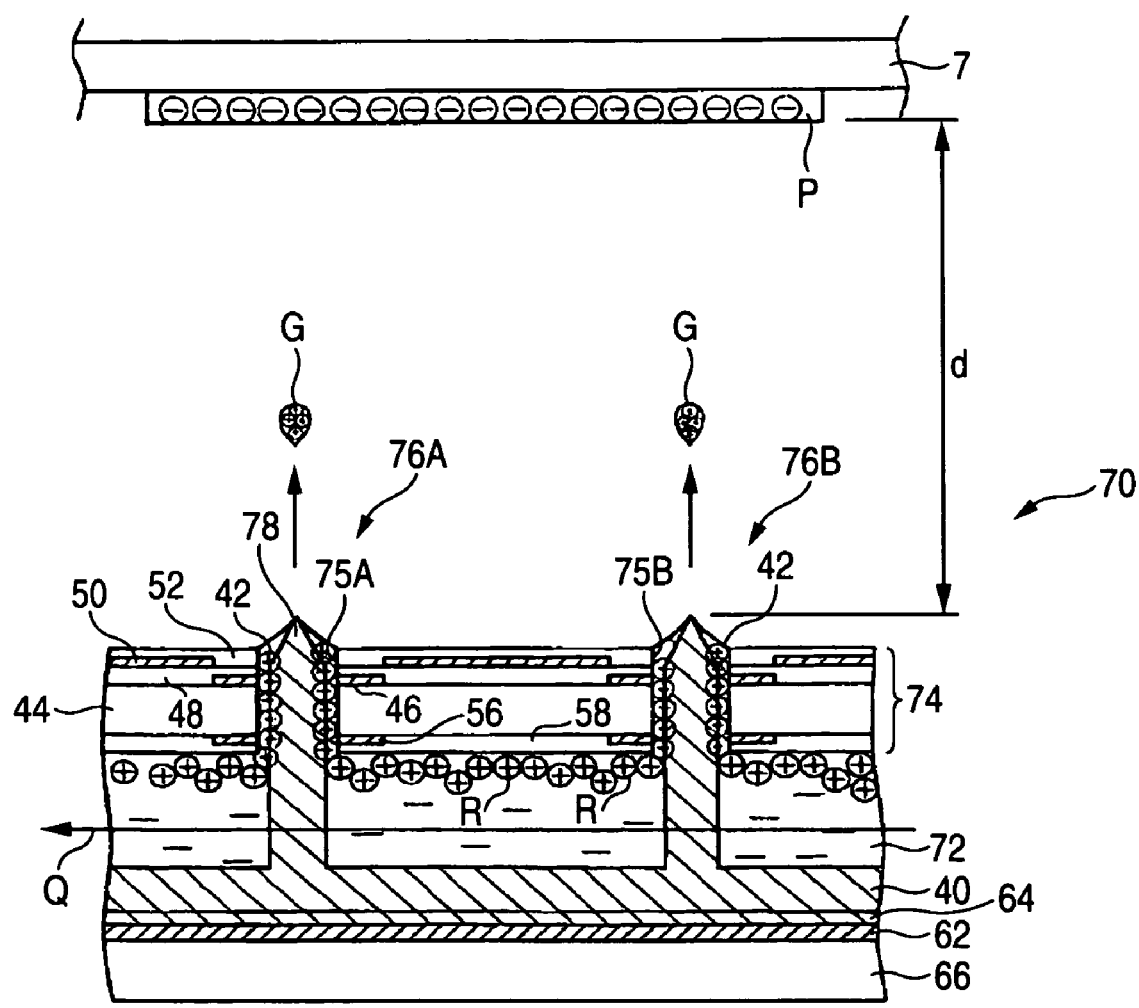
FIG. 3 is a side cross-sectional view (corresponding to the portion cut along the arrow X-X in FIG. 2) showing the distributed state of charged particles when a large number of ejection parts are used in the inkjet head shown in FIG. 2.

Reference numerals and signs in FIGS. 1 to 3 are described below.
G Flown ink droplet
P Recording medium
Q Ink flow
R Charged particle
1 Inkjet recording apparatus
2 Ejection head 3 Ink circulating system
4 Head driver
5 Position-Controlling means
6A to 6C Rollers for straining transportation belt
7 Transportation belt
8 Transportation belt position-detecting means
9 Electrostatic adsorption means
10 Destaticizing means
11 Dynamic means
12 Feed roller
13 Guide
14 Image fixing means
15 Guide
16 Recording medium position-detecting means
17 Exhaust fan
18 Solvent vapor adsorbent
38 Ink guide
40 Supporting rod part
42 Ink meniscus
44 Insulating layer
46 First ejection electrode
48 Insulating layer
50 Guard electrode
52 Insulating layer
56 Second ejection electrode
58 Insulating layer
62 Floating conductive plate
64 Cover film
66 Insulating member
70 Inkjet head
72 Ink flow path
74 Substrate
75, 75A, 75B Openings
76, 76A, 76B Ejection parts
78 Ink guide part

DETAILED DESCRIPTION OF THE INVENTION

An exemplary embodiment of the present invention is described in detail below.

(Non-Aqueous Solvent)

The non-aqueous solvent for use in the present invention is preferably a non-polar insulating solvent having a dielectric constant of 1.5 to 20 and a surface tension of 15 to 60 mN/m (at 25° C.), and this solvent preferably has low toxicity, low flammability and less odor. Examples of such a non-aqueous solvent include a solvent selected from a linear or branched aliphatic hydrocarbon, an alicyclic hydrocarbon, an aromatic hydrocarbon, a petroleum naphtha, and a halogen-substituted product thereof. For example, solvents selected from hexane, octane, isooctane, decane, isodecane, decalin, nonane, dodecane, isododecane, Isopar (Isopar E, Isopar G, Isopar H and Isopar L, produced by Exxon Chemical Co.), Soltol (produced by Phillips Petroleum Co.), IP Solvent (produced by Idemitsu Petrochemical Co., Ltd.), and a petroleum naphtha such as S.B.R., Shellsol 70, Shellsol 71 (produced by Shell Oil and Chemical Co.) and Pegasol (produced by Mobil Oil Corp.) are used individually or in combination.

The hydrocarbon solvent is preferably a high-purity isoparaffin-based hydrocarbon having a boiling point of 150 to 350° C. Examples of the commercially available product thereof include Isopar G, Isopar H, Isopar L, Isopar M, Isopar V, Norpar 12, Norpar 13 and Norpar 15 (trade names, produced by Exxon Chemical Co.); IP Solvent 1620 and IP Solvent 2028 (trade names, produced by Idemitsu Petrochemical Co., Ltd.); Isosol 300 and Isosol 400 (trade names, produced by Nippon Petrochemicals Co., Ltd.); and Amsco OMS and Amsco 460 Solvent (trade names, produced by American Mineral Spirits Corp.). These products are an aliphatic saturated hydrocarbon having an extremely high purity, and have a viscosity at 25° C. of 3 cSt or less, a surface tension at 25° C. of 22.5 to 28.0 mN/m and a resistivity at 25° C. of 1010 Ω·cm or more. Furthermore, these products are stable by virtue of low reactivity, safe with low toxicity and less odorous.

As for the halogen-substituted hydrocarbon solvent, a fluorocarbon-base solvent is known and examples thereof include perfluoroalkanes represented by $C_nF_{2n+2}$, such as $C_7F_{16}$ and $C_8F_{18}$ (e.g., "Fluorinert PF5080" and "Fluorinert PF5070" (trade names), produced by Sumitomo 3M Ltd.), a fluorine-based inert liquid (e.g., "Fluorinert FC Series" (trade name), produced by Sumitomo 3M Ltd.), fluorocarbons (e.g., "Krytox GPL Series" (trade name), produced by DuPont Japan Ltd.), fleons (e.g., "HCFC-141b" (trade name), produced by Daikin Industries, Ltd.), and iodinated fluorocarbons such as $(F(CF_2)_4CH_2CH_2I)$ and $(F(CF_2)_6I)$ (e.g., "I-1420" and "I-1600" (trade names), produced by Daikin Fine Chemical Laboratory, Ltd.).

As for the non-aqueous solvent for use in the present invention, a higher fatty acid ester and a silicone oil may also be used. Specific examples of the silicone oil include a low-viscosity synthetic dimethylpolysiolxane, and examples of the commercially available product thereof include KF96L (trade name), produced by Shin-Etsu Silicone, and SH200 (trade name), produced by Dow Corning Toray Silicone Ltd. The silicone oil is not limited to these specific examples. As for the dimethylpolysiloxane, those having a very broad viscosity range are available depending on the molecular weight, but a dimethylpolysiloxane having a viscosity of 1 to 20 cSt is preferably used. Similarly to the isoparaffin-based hydrocarbon, such a dimethylpolysiloxane has a volume resistivity of $10^{10}$ Ω·cm or more and is characterized by high stability, high safety and no odor. Furthermore, the dimethylpolysiloxane has a low surface tension, specifically, a surface tension of 18 to 21 mN/m.

Examples of the solvent which can be mixed and used together with the above-described organic solvent include a solvent such as alcohols (e.g., methyl alcohol, ethyl alcohol, propyl alcohol, butyl alcohol, fluorinated alcohol), ketones (e.g., acetone, methyl ethyl ketone, cyclohexanone), carboxylic acid esters (e.g., methyl acetate, ethyl acetate, propyl acetate, butyl acetate, methyl propionate, ethyl propionate), ethers (e.g., diethyl ether, dipropyl ether, tetrahydrofuran, dioxane), and halogenated hydrocarbons (e.g., methylene dichloride, chloroform, carbon tetrachloride, dichloroethane, methyl-chloroform).

(Coloring Material)

The coloring material for use in the present invention is described in detail below.

The coloring material is not particularly limited, and any organic or inorganic pigment generally available on the market, a pigment dispersed in a resin insoluble in the dispersion medium, or a pigment surface-grafted with a resin may be used.

Specific examples of the organic or inorganic pigment which provides a yellow color include a monoazo pigment such as C.I. Pigment Yellow 1 (e.g., Fast Yellow G) and C.I. Pigment Yellow 74; a disazo pigment such as C.I. Pigment Yellow 12 (e.g., Disazo Yellow AAA) and C.I. Pigmeni Yellow 17; a non-benzidine type azo pigment such as C.I. Pigment Yellow 180; an azo lake pigment such as C.I. Pigment Yellow 100 (e.g., Tartrazine Yellow Lake); a condensed azo pigment such as C.I. Pigment Yellow 95 (e.g., Condensed Azo Yellow GR); an acidic dye lake pigment such as C.I. Pigment Yellow 115 (e.g., Quinoline Yellow Lake); a basic dye lake pigment such as C.I. Pigment Yellow 18 (e.g., Thioflavin Lake); an anthraquinone-based pigment such as Flavanthrone Yellow (Y-24); an isoindolinone pigment such as Isoindolinone Yellow 3RLT (Y-110); a quinophthalone pigment such as Quinophthalone Yellow (Y-138); an isoindoline pigment such as Isoindoline Yellow (Y-139); a nitroso pigment such as C.I. Pigment Yellow 153 (e.g., Nickel Nitroso Yellow); and a metal complex salt azomethine pigment such as C.I. Pigment Yellow 117 (e.g., Copper Azomethine Yellow).

Specific examples of the pigment which provides a magenta color include a monoazo-based pigment such as C.I. Pigment Red 3 (e.g., Toluidine Red); a disazo pigment such as C.I. Pigment Red 38 (e.g., Pyrazolone Red B); an azo lake pigment such as C.I. Pigment Red 53:1 (e.g., Lake Red C) and C.I. Pigment Red 57:1 (Brilliant Carmine 6B); a condensed azo pigment such as C.I. Pigment Red 144 (e.g., Condensed Azo Lake BR); an acidic dye lake pigment such as C.I. Pigment Red 174 (e.g., Phloxine B Lake); a basic dye lake pigment such as C.I. Pigment Red 81 (e.g., Rhodamine 6G' Lake); an anthraquinone-based pigment such as C.I. Pigment Red 177 (e.g., Dianthraquinonyl Red) a thioindigo pigment such as C.I. Pigment Red 88<(e.g., Thioindigo Bordeaux); a perinone pigment such as C.I. Pigment Red 194 (e.g., Perinone Red); a perylene pigment such as C.I. Pigment Red 149 (e.g., Perylene Scarlet); a quinacridone pigment such as C.I. Pigment Red 122 (e.g., Quinacridone Magenta); an isoindolinone pigment such as C.I. Pigment Red 180 (e.g., Isoindolinone Red 2BLT); and an arizalin lake pigment such as C.I. Pigment Red 83 (e.g., Madder Lake).

Specific examples of the pigment which provides a cyan color include a disazo-based pigment such as C.I. Pigment Blue 25 (e.g., Dianisidine Blue); a phthalocyanine pigment such as C.I. Pigment Blue 15 (e.g., Phthalocyanine Blue); an acidic dye lake pigment such as C.I. Pigment Blue 24 (e.g., Peacock Blue Lake); a basic dye lake pigment such as C.I. Pigment Blue 1 (e.g., Victoria Pure Blue BO Lake); an anthraquinone-based pigment such as C.I. Pigment Blue 60 (e.g., Indanthrone Blue); and an alkali blue pigment such as C.I. Pigment Blue 18 (Alkali Blue V-5:1).

Specific examples of the pigment which provides a black color include an organic pigment such as aniline black-based pigment (e.g., BK-1 (Aniline Black)), an iron oxide pigment, and a carbon black pigment such as furnace black, lamp black, acetylene black and channel black. Specific examples of the carbon black pigment include MA-8, MA-10, MA-11, MA-100, MA-220, #25, #40, #260, #2600, #2700B, #3230B, CF-9, MA-100R and MA-200RB, produced by Mitsubishi Chemical Corp.; Printex 75 and Printex 90, produced by Degussa Co.; and Monark 800 and Monark 1100, produced by Cabot Co. In addition, a metal powder may also be used for reproducing a color such as gold, silver and copper.

Other than these pigments, a processed pigment obtained by dispersing pigment fine particles in a rosin ester resin, a vinyl chloride-vinyl acetate resin or the like is commercially available and such a pigment may also be used. Specific examples of the commercially available processed pigment include a Microlith pigment produced by Ciba Specialty Chemicals. Preferred examples of the processed pigment include a Microlith-T pigment in which the pigment is covered with a rosin ester resin.

In the present invention, the concentration of the coloring material is preferably from 0.5 to 20 mass % (weight %), more preferably from 2 to 75 mass % based on the total amount of the ink composition. When the concentration of the coloring material is 0.5 mass % or more, a sufficiently high printing density can be obtained, and when the concentration of the coloring material is 20 mass % or less, the ink can be stably ejected without causing serious increase in the viscosity of the ink composition.

(Resin Insoluble in Non-Aqueous Solvent)

The resin insoluble in a non-aqueous solvent is described below.

As for the resin insoluble in a non-aqueous solvent, various known natural or synthetic resins may be used. Examples thereof include an acrylic resin, an epoxy resin, a polyester resin, an ethylene-vinyl acetate resin, a vinyl chloride-vinyl acetate resin, a styrene-butadiene resin and a styrene-acrylic resin. The above-described pigments may be dispersed in such a resin by using various known methods employed in the production process of an electrophotographic toner.

In addition, a coloring material particle covered with a commercially available resin may also be used. Specific examples thereof include a Microlith-T pigment described above, in which the pigment is covered with a rosin ester resin.

The resin preferably has a function of adsorbing on a pigment and well dispersing in a non-aqueous solvent and for this purpose, a resin having a moiety solvating with a solvent, a moiety scarcely solvating with a solvent and a polar group-containing moiety is preferred. Examples of the monomer which solvates with a solvent after polymerization include lauryl methacrylate, stearyl methacrylate, 2-ethylhexyl methacrylate and cetyl methacrylate. Examples of the monomer which scarcely solvates with a solvent after polymerization include methyl methacrylate, ethyl methacrylate, isopropyl methacrylate, styrene and vinyltoluene. Examples of the polar group-containing monomer include an acid group monomer such as acrylic acid, methacrylic acid, itaconic acid, fumaric acid, maleic acid, styrenesulfonic acid and their alkali salt, and a basic group monomer such as dimethylaminoethyl methacrylate, diethylaminoethyl methacrylate, vinylpyridine, vinylpyrrolidine, vinylpiperidine and vinyl lactam.

(Preparation of Resin Covered Coloring Material Particle)

The particle of a coloring material covered (or coated) with a resin insoluble in a non-aqueous solvent (resin-covered coloring material particle) can be formed by covering a coloring material with the above-described resin insoluble in a non-aqueous solvent (hereinafter, this resin is sometimes simply referred to as "a binder resin") to prepare a colored mixture, and dispersing the colored mixture, preferably after pulverizing the colored mixture, in a non-aqueous solvent with use of a dispersant having no coloring material-dispersing property.

For example, the colored mixture may be prepared by the following methods.

(1) A method of melt-kneading a coloring material and a binder resin at a temperature higher than the softening point of the binder resin in a kneading machine such as roll mill, Banbury mixer or kneader, and cooling and then pulverizing the kneaded product to obtain a colored mixture.

(2) A method of dissolving a binder resin in a solvent, adding thereto a coloring material, wet-dispersing the mixture in a ball mill, an attritor, a sand grinder or the like, and evaporating the solvent to obtain a colored mixture or pouring the dispersion into a non-solvent for the binder resin to precipitate the mixture and drying it to obtain a colored mixture.

(3) A flashing method which is a method of kneading a pigment hydrous paste (wet cake) together with a resin or a resin solvent, replacing water with a resin or a resin solution, and removing water and the solvent by drying the mixture under reduced pressure to obtain a colored mixture.

The colored mixture obtained as above is then preferably dry-pulverized to obtain particles having a volume average particle size (average volume diameter) of usually from 5 to 1,000 μm, preferably from 5 to 100 μm, and the particles are dispersed in a non-aqueous solvent together with a dispersant to obtain a liquid dispersion, whereby the resin-covered coloring material particles are dispersed in a non-aqueous solvent.

In this dispersing step, the dispersion treatment is performed in a non-aqueous solvent by using a dispersant having no coloring material-dispersing property generally in an amount of 5 to 100 parts, preferably from 10 to 50 parts by mass, per 100 parts by mass (weight) of the colored mixture.

In the present invention, the temperature at the dispersion treatment using a dispersant having no coloring material-dispersing property is in general preferably 1° C. or more.

Incidentally, in terms of causing heat fusion among resin-covered coloring material particles and decreasing the proportion of microfine coloring material particles, the temperature at the dispersion treatment is preferably a temperature higher than Tg of the coloring material-covering resin insoluble in a non-aqueous solvent, more preferably from Tg of resin insoluble in non-aqueous solvent +1° C. to Tg +30° C.

The dispersion time is preferably from 1 to 15 hours, more preferably from 1 to 10 hours.

The Tg can be measured by using a differential thermal measuring apparatus or a viscoelasticity measuring apparatus.

By using a dispersant not showing a coloring material-dispersing property, the production of pigment fine particles can be suppressed. Furthermore, by the dispersion treatment at a temperature higher than Tg of the resin insoluble in a non-aqueous solvent, heat fusion can be caused among resin-covered coloring material particles having an average particle diameter of 0.2 μm or less, and coloring material particles having an average particle diameter of 0.3 to 4 μm can be obtained. That is, the proportion of microfine coloring material particles of 0.2 μm or less can be decreased and good ejection stability can be obtained.

The heating dispersion treatment time is preferably from 1 to 10 hours.

Also, since a dispersant having no coloring material-dispersing property is used as the dispersant, a dispersion in which a microfine particle comprising only a coloring material is not present can be obtained.

The dispersing machine for use in the dispersing step is not particularly limited and a commercially available dispersing machine can be used. Examples thereof include a ball mill, a sand mill and an attritor. In order to prevent evaporation of the solvent, a closed dispersing machine is generally used. The sand mill includes a vertical type and a horizontal type and in the sand mill, the dispersion is performed by rotating a shaft having fixed thereon discs or pins at a peripheral velocity of 3 to 15 n/s. When several continuous sand mills are arranged in series and dispersion is performed by varying the media diameter according to the degree of dispersion, an ink composition can be obtained with good efficiency. Also, in the case of dispersing a pigment having a large particle diameter by using a continuous sand mill, pre-dispersion is necessary and a disperser, a ball mill or a batch-type sand mill is used as the pre-dispersing machine.

Specific examples of the horizontal sand mill include Dyno-Mill, Dyno-Mill ECM (manufactured by WAB, Switzerland), Pearl Mill, DCP (manufactured by Drais, Germany), Agitator Mill (manufactured by Netzsch, Germany), Super-Mill (manufactured by Susmeyer, Belgium), Cobol Mill (manufactured by Frema, Switzerland) and Spike Mill (manufactured by Inoue Seisakusho).

As for the media used in a ball mill or a sand mill, those made of various materials such as zirconia, titania, alumina, glass, steel and silicon nitride may be used. The construction material of media is selected in view of specific gravity, abrasion resistance and the like of the media in accordance with the viscosity of liquid dispersion and the degree of pre-dispersion.

The media diameter is not particularly limited but, for example, media having a diameter of approximately from 0.1 to 10 mm may be used. In general, there is a tendency that use of larger media gives a broader particle size distribution and use of smaller media enables dispersion of even particles having a smaller particle diameter. The packing ratio of media is also not particularly limited, but a media packing ratio of 50 to 90% is preferred. The packing ratio of media has a close relationship with the dispersing performance, and it is generally known that as the packing ratio can be made higher, the dispersing efficiency is more enhanced. In the case of a horizontal mill, a locking phenomenon of media does not occur at all at the starting as compared with the vertical type and therefore, a packing ratio of 80 to 85%=based on the volume of vessel is preferred.

The method for controlling the temperature of the liquid dispersion is not particularly limited, but the temperature of the liquid dispersion can be controlled, for example, by providing a jacket around the dispersing machine and cooling the liquid dispersion with a coolant such as cold water, or by providing a heat exchanger on the ejection side of the dispersing machine, monitoring the liquid dispersion temperature, and controlling the coolant temperature according to the change in the liquid dispersion temperature.

As for the control of the liquid temperature, the liquid dispersion may be adjusted to an objective liquid dispersion temperature by setting constant the coolant temperature in the dispersing step or by elevating the liquid dispersion temperature in several parts.

When the dispersant is used in an amount of 5 parts by mass or more per 100 parts by mass of the colored mixture, a coarse particle is less produced and higher dispersion stability is obtained, and when the dispersion is used in an amount of 50 parts by mass or less, the proportion of microfine coloring material particles of 0.2 μm or less is easy to be more decreased and higher ejection stability is easy to be obtained.

The average particle diameter of resin-covered coloring material particles formed by the heating dispersion is preferably from 0.3 to 4 μm, more preferably from 0.3 to 3 μm, still more preferably from 0.4 to 2 μm. The proportion of microfine coloring material particles of 0.2 μm or less is, on the volume basis, preferably 5% or less, more preferably 4% or less, still more preferably 3% or less.

In the dispersion treatment step, a dispersant is used for dispersing the resin-covered coloring material particles in the form of a fine particle and at the same time, stabilizing the dispersion in the non-aqueous solvent. The dispersant is used, for example, by the following methods:

1. a pigment composition prepared by previously mixing a colored mixture and the dispersant is added to a non-aqueous solvent and dispersed therein; and 2. a colored mixture and the dispersant are separately added to a non-aqueous solvent and dispersed.

The objective effect can be obtained by any of these methods.

(Dispersant)

As described above, in the present invention, a dispersant having no coloring material-dispersing property in a non-aqueous solvent is used as the dispersant.

The "dispersant having no coloring material-dispersing property" means a dispersant which contributes, in a non-aqueous solution, to the dispersion of a coloring material having on the surface thereof a resin (resin-covered coloring material particle) but does not contribute to the dispersion of a particle comprising only a coloring material. More specifically, this is a dispersant having a property of, in a system containing a non-aqueous solvent, a coloring material and a dispersant, not dispersion-stabilizing coloring material particles having a small volume average particle diameter (for example, 0.5 μm or less) in the non-aqueous solvent. Such a dispersant can be evaluated, for example, by the following method.

When 1 part by mass of a coloring material is dispersed together with from 0.2 to 2 parts by mass of a dispersant by using a dispersing machine described above under the conditions that the coloring material concentration in a non-aqueous solvent is from 5 to 50 mass % and when coloring material particles having a volume average particle diameter of 0.5 μm or less are not obtained, this dispersant is judged as a dispersant having no coloring material-dispersing property.

Preferably, 0.5 parts by mass of a dispersant, 10 parts by mass of a non-aqueous solvent and 35 parts by mass of glass beads as the media are used per 1 part by mass of a coloring material, and a paint shaper or Dyno-mill is used as the dispersing machine. The dispersion is performed for 1 to 6 hours and the volume average particle diameter in the process of dispersion is evaluated. The dispersant for use in the present invention means a dispersant incapable of giving coloring material particles of 0.5 μm or less.

Specific examples of the dispersant include a nonionic surfactant such as sorbitan fatty acid ester (e.g., sorbitan monooleate, sorbitan monolaurate, sorbitan sesquioleate, sorbitan trioelate), polyoxyethylene sorbitan fatty acid ester (e.g., polyoxyethylene sorbitan monostearate, polyoxyethylene sorbitan monooleate), polyethylene glycol fatty acid ester (e.g., polyoxyethylene menostearate, polyethylene glycol diisostearate), polyoxyethylene alkylphenyl ether (e.g., polyoxyethylene nonylphenyl ether, polyoxyethylene octylphenyl ether), and aliphatic diethanolamide type. Furthermore, the polymer-type dispersant is preferably a polymer compound having a molecular weight of 1,000 or more, and examples thereof include a styrene-maleic acid resin, a styrene-acrylic resin, rosin; BYK-160, BYK-162, BYK-164 and BYK-182 (urethane-based polymer compound, produced by BYK-Chemie); EFKA-47 and LP-4050 (urethane-based dispersant, produced by EFKA); Solsperse 24000 (polyester-based polymer compound, produced by Zeneca PLC); and Solsperse 17000 (aliphatic diethanolamide type, produced by Zeneca PLC).

Other examples of the polymer-type dispersant include a random copolymer comprising a monomer solvating with a solvent, such as lauryl methacrylate, stearyl methacrylate, 2-ethylhexyl methacrylate and cetyl methacrylate, a monomer scarcely solvating with a solvent, such as methyl methacrylate, ethyl methacrylate, isopropyl methacrylate, styrene and vinyltoluene, and a polar group-containing moiety; and a graft copolymer described in JP-A-3-188469. Examples of the polar group-containing monomer include an acid group monomer such as acrylic acid, methacrylic acid, itaconic acid, fumaric acid, maleic acid, styrenesulfonic acid and their alkali salt, and a basic group monomer such as dimethylaminoethyl methacrylate, diethylaminoethyl methacrylate, vinylpyridine, vinylpyrrolidine, vinylpiperidine and vinyl lactam. In addition, for example, a styrene-butadiene copolymer, a block copolymer of styrene and a long-chain alkyl methacrylate disclosed in JP-A-60-10263, and a block copolymer disclosed in JP-A-6-95436 may be used. Furthermore, examples of the pigment dispersant include a graft copolymer disclosed in JP-A-4-350669 and JP-A-5-188657, a graft group-containing random copolymer soluble in a non-aqueous solvent disclosed in JP-A-11-43638, a partially crosslinked polymer disclosed in JP-A-10-316917, and a partially crosslinked polymer containing a graft group at the main chain terminal disclosed in JP-A-10-316920. Preferred examples of the pigment dispersant include a graft copolymer disclosed in JP-A-3-188469, JP-A-4-350669 and JP-A-5-188657. However, the pigment dispersant is not limited to these.

Preferred examples of the dispersant include a graft polymer containing in the main chain a repeating unit represented by formula (1):

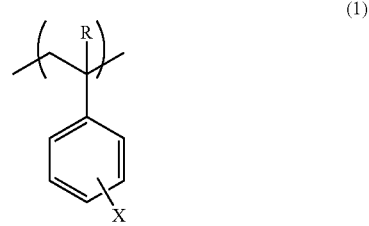

wherein R represents a hydrogen atom or a methyl group, X represents an alkyl group having a carbon number of 1 to 10, a halogen atom, $-OR^1$, $-COOR^1$ or $-CONR^1R^2$, $R^1$ represents an organic group having a carbon number of 1 to 10, and $R^2$ represents a hydrogen atom or an organic group having a carbon number of 1 to 10.

Examples of the organic group of $R^1$ and $R^2$ include an alkyl group (e.g., methyl, ethyl, propyl, phenylmethyl, phenylethyl) and an aryl group (e.g., phenyl, tolyl).

The above-described graft polymer is more preferably a polymer having a mass-average molecular weight (weight-average molecule weight) of 1,000 or more and containing at least a constituent unit represented by formula (1) and a constituent unit represented by formula (2). The mass average molecular weight of this polymer is preferably from 1,000 to 200,000, more preferably from 10,000 to 100,000.

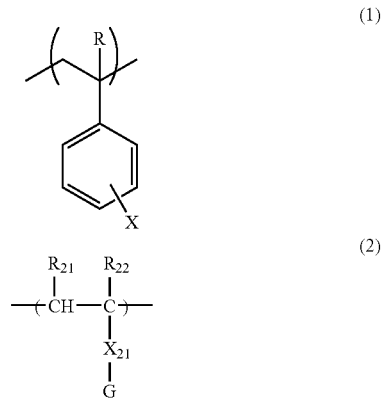

The graft polymer preferably contains the repeating unit represented by formula (1) in the main chain.

In formula (1), R represents a hydrogen atom or a methyl group, X represents an alkyl group having a carbon number of 1 to 10, a halogen atom, —OR$^1$, —COOR$^1$ or —CONR$^1$R$^2$, R$^1$ represents an organic group having a carbon number of 1 to 10, and R$^2$ represents a hydrogen atom or an organic group having a carbon number of 1 to 10.

In formula (2),

R$_{21}$ and R$_{22}$, which may be the same or different, each represents a hydrogen atom or a methyl group, X$_{21}$ represents a single bond or a divalent linking group comprising two or more atoms selected from C, H, N, O, S and P and having a total atom number of 50 or less, and G represents a polymer component having a mass average molecular weight of 500 or more and containing at least a constituent unit represented by the following formula (3), or a polydimethylsiloxane group having a mass average molecular weight of 500 or more:

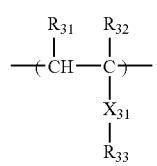

(3)

In formula (3),

R$_{31}$ and R$_{32}$, which may be the same or different, each represents a hydrogen atom or a methyl group, R$_{33}$ represents a hydrogen atom or a hydrocarbon group having a carbon number of 1 to 30, which may have a substituent, and the hydrocarbon group of R$_{33}$ may contain an ether bond, an ester bond, an amide bond, a carbamate bond, an amino group, a hydroxyl group or a halogen substituent, and X$_{31}$ represents a single bond or a divalent linking group comprising two or more atoms selected from C, H, N, O, S and P and having a total atom number of 50 or less.

The graft polymer containing at least a constituent unit represented by formula (1) and a constituent unit represented by formula (2), which is suitably used in the present invention, can be obtained by polymerizing a radical polymerizable monomer corresponding to formula (1) and a radical polymerizable macromonomer corresponding to formula (2) with use of a known radical polymerization initiator. The monomer corresponding to formula (1) is a monomer represented by the following formula (1M) and the macromonomer corresponding to formula (2) is a macromonomer represented by the following formula (2M):

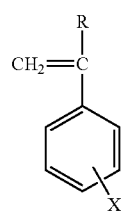

(1M)

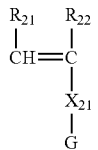

(2M)

The symbols in formulae (1M) and (2M) have the same meanings as those in formulae (1) and (2).

The macromonomer represented by formula (2M) is a polymer having a radical polymerizable functional group at the terminal, which is obtained by polymerizing a radical polymerizable monomer corresponding to formula (3) and represented by the following formula (3M), if desired, in the presence of a chain transfer agent, and introducing a radical polymerizable functional group into the terminal of the obtained polymer.

The macromonomer represented by formula (2M) is preferably a macromonomer having a mass average molecular weight of 500 to 500,000 and a polydispersity (mass average molecular weight/number average molecular weight) of 1.0 to 7.0. Also, the macromonomer represented by formula (2M) may be polydimethylsiloxane having a radical polymerizable functional group at the terminal.

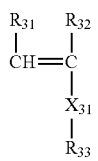

(3M)

The symbols in formula (3M) have the same meanings as those in formula (3).

Examples of the monomer represented by formula (3M) include (meth)acrylic acid esters such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, cyclohexyl (meth)acrylate, dodecyl (meth)acrylate, stearyl (meth)-acrylate, phenyl (meth)acrylate, benzyl (meth)acrylate and 2-hydroxyethyl (meth)acrylate; (meth)acrylamides such as N-methyl(meth) acrylamide, N-propyl(meth)acrylamide, N-phenyl(meth) acrylamide and N,N-dimethyl(meth)acrylamide; styrenes such as styrene, methylstyrene, chlorostyrene and methoxystyrene; hydrocarbons such as 1-butene; vinyl acetates; vinyl ethers; and vinylpyridines.

The main chain moiety of the graft polymer is insoluble in the non-aqueous solvent. In the graft main chain, other radical polymerizable monomers can be copolymerized. The proportion of the repeating unit represented by formula (1) in the main chain is from 1 to 100 mol %, preferably from 50 to 100 mol %, more preferably from 75 to 100 mol %.

The graft polymer for use in the present invention may comprise only the constituent units represented by formulae (1) and (2) but may contain other constituent components. Examples of the radical polymerizable monomer which can be used for copolymerizing other constituent units include a monomer represented by the following formula (4M):

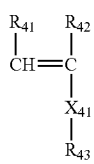

In formula (4M), $R_{41}$ and $R_{42}$, which may be the same or different, each represents a hydrogen atom or a methyl group, $R_{43}$ represents a hydrogen atom or a hydrocarbon group having a carbon number of 1 to 30, which may have a substituent, and the hydrocarbon group of $R_{43}$ may contain an ether bond, an ester bond, an amide bond, a carbamate bond, an amino group, a hydroxyl group or a halogen substituent, and $X_{41}$ represents a single bond or a divalent linking group comprising two or more atoms selected from C, H, N, O, S and P and having a total atom number of 50 or less.

Examples of the monomer represented by formula (4M) include (meth)acrylic acid esters such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, cyclohexyl (meth)acrylate, dodecyl (meth)acrylate, stearyl (meth)-acrylate, phenyl (meth)acrylate, benzyl (meth)acrylate and 2-hydroxyethyl (meth)acrylate; (meth)acrylamides such as N-methyl(meth)acrylamide, N-propyl(meth)acrylamide, N-phenyl(meth)acrylamide and N,N-dimethyl(meth)acrylamide; styrenes such as styrene, methylstyrene, chlorostyrene and methoxystyrene; hydrocarbons such as 1-butene; vinyl acetates; vinyl ethers; and vinylpyridines.

Specific examples of preferred graft polymers for use in the present invention are set forth below, but the present invention is not limited to these specific examples.

P-1

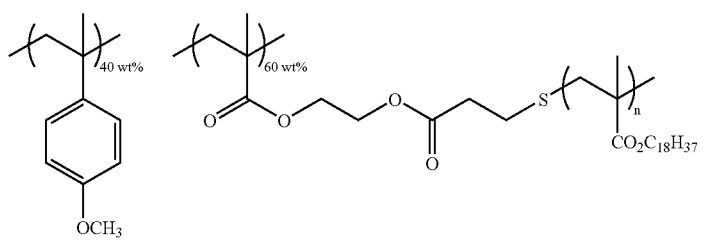

P-2

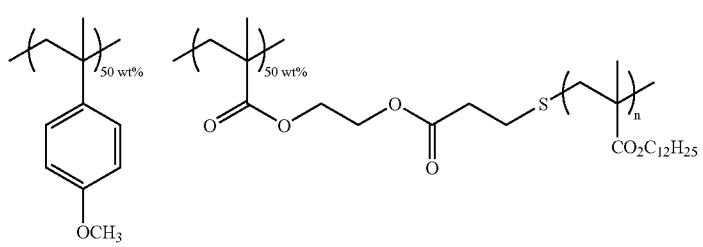

P-3

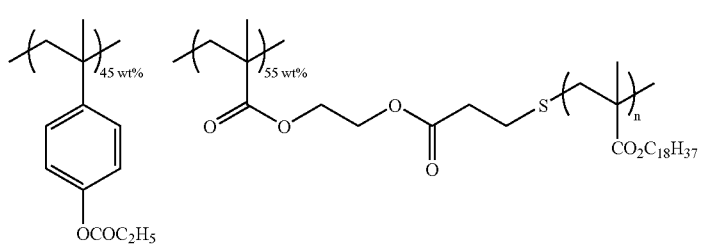

P-4

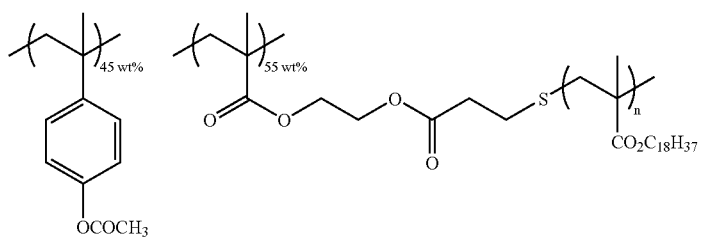

-continued
P-5
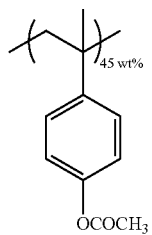 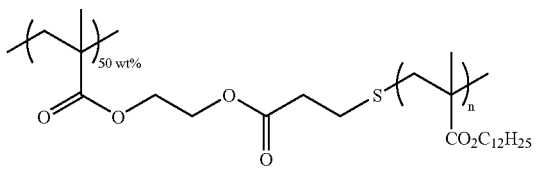
P-6
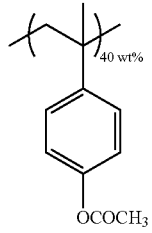 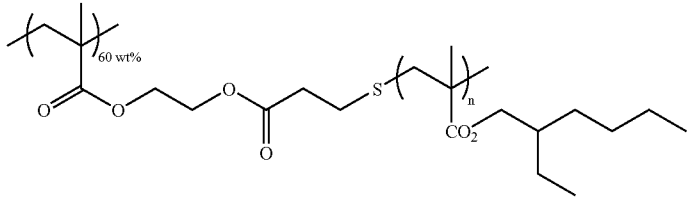
P-7
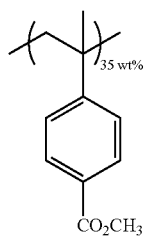 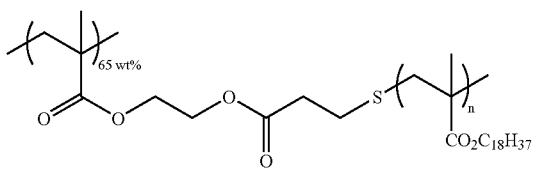
P-8
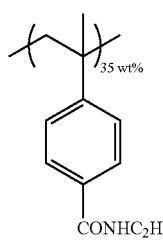 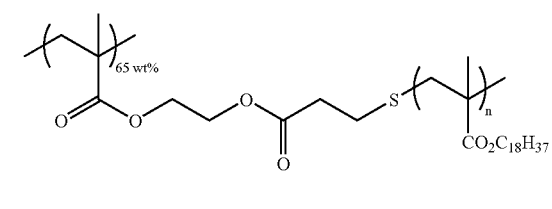
P-9
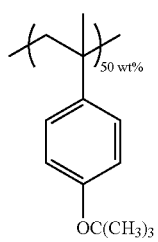 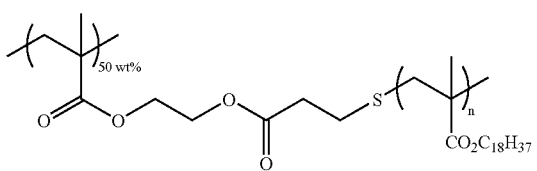
P-10
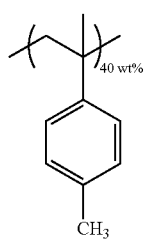 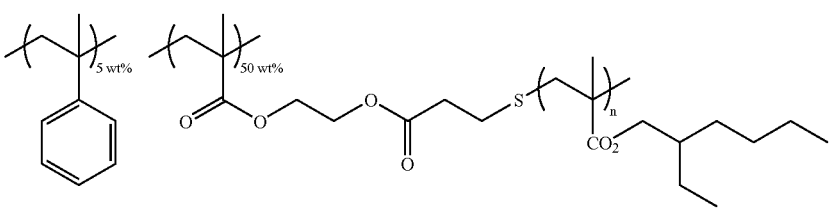

-continued
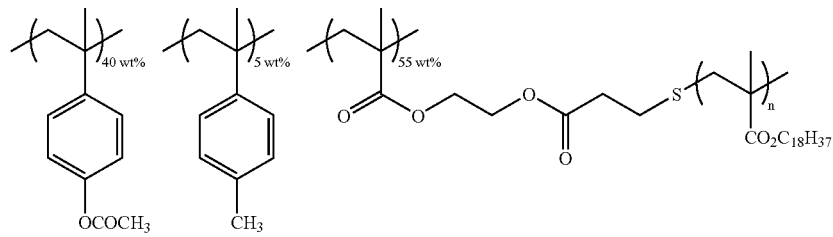 P-11
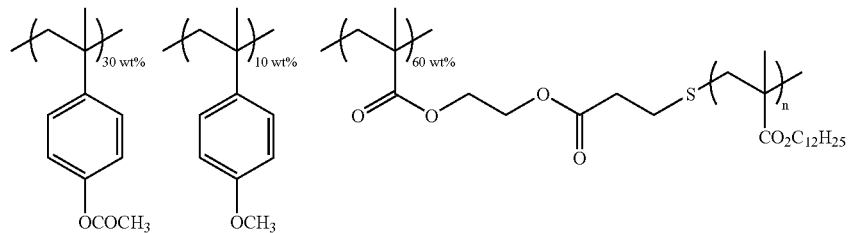 P-12
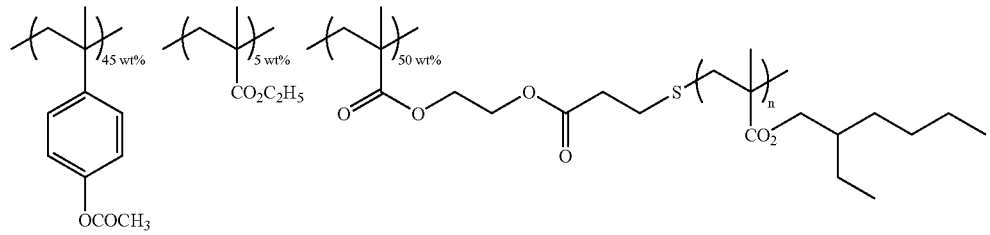 P-13
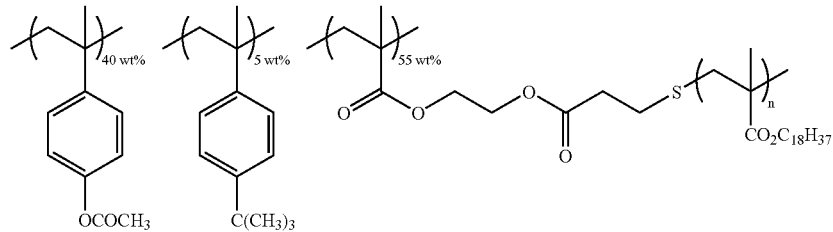 P-14
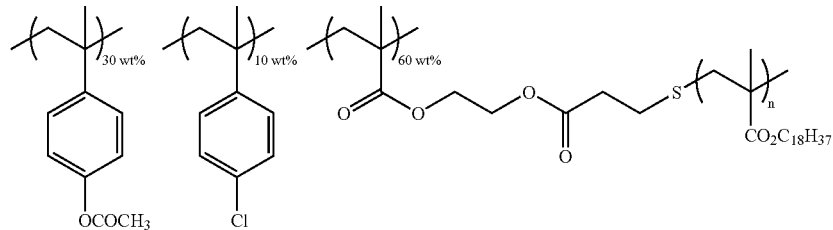 P-15
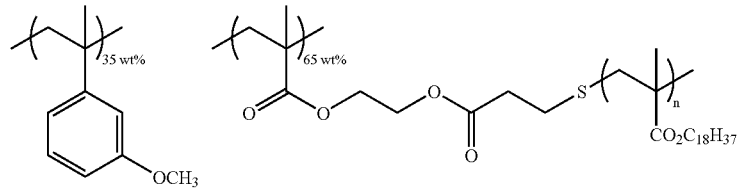 P-16
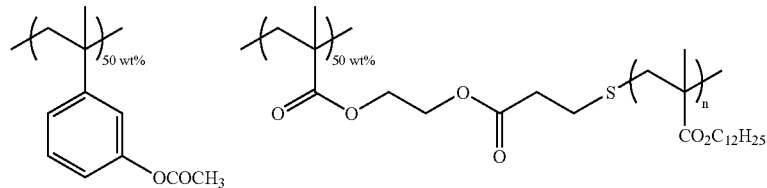 P-17

-continued

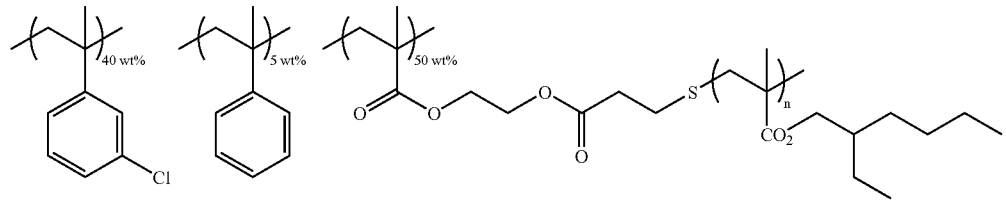

P-18

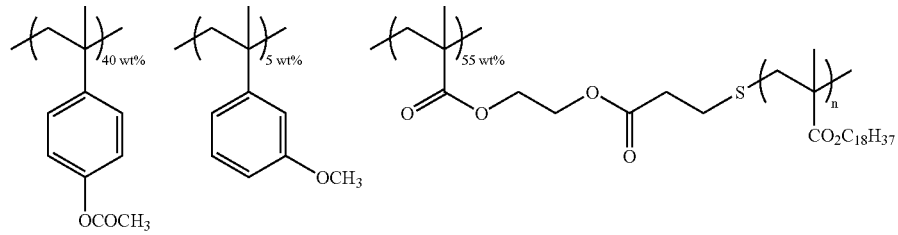

P-19

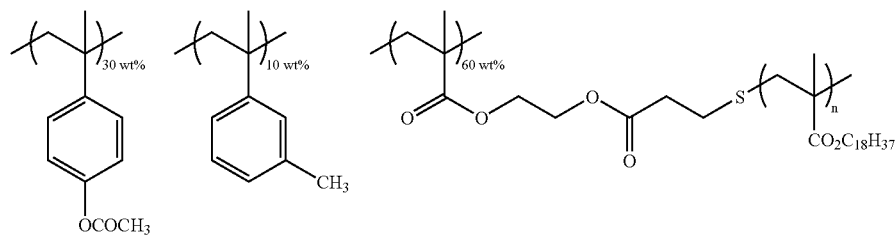

P-20

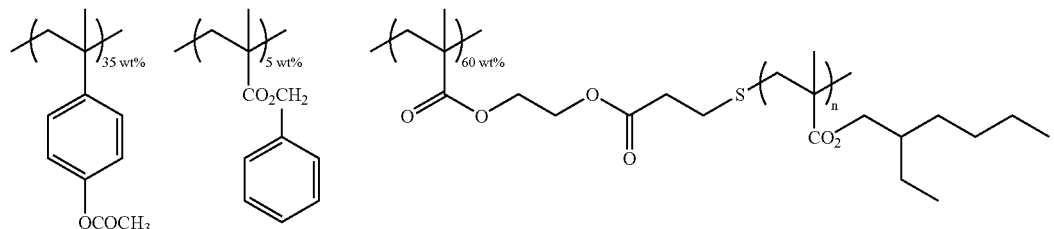

P-21

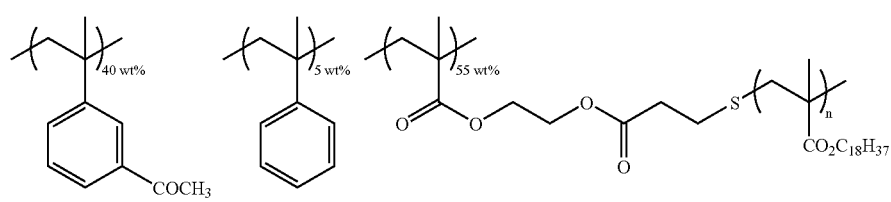

P-22

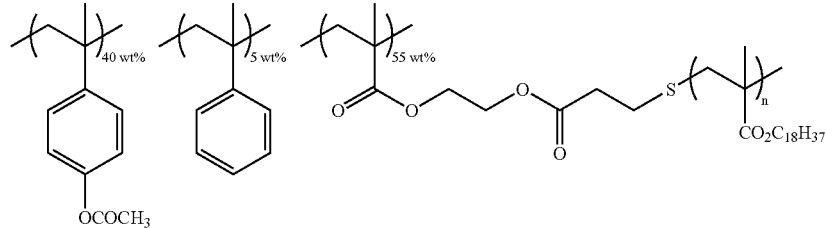

P-23

(Charge-Control Agent)

In the present invention, resin-covered coloring material particles are dispersed (formed into particles) in a dispersion medium by using a dispersant and for controlling the electric charge amount of the particle, a charge-control agent is preferably used in combination.

Suitable examples of the charge-control agent include a metal salt of an organic carboxylic acid, such as zirconium naphthenate and zirconium octenate; an ammonium salt of an organic carboxylic acid, such as tetramethylammonium stearate; a metal salt of an organic sulfonic acid, such as sodium dodecylbenzenesulfonate and magnesium dioctylsulfosuccinate; an ammonium salt of an organic sulfonic acid, such as tetrabutylammonium toluenesulfonate; a polymer having a carboxylic acid group in the side chain, such as carboxylic acid group-containing polymer obtained by modifying a copolymer of styrene and maleic anhydride with amine; a polymer having a carboxylate anion group in the side chain, such as copolymer of stearyl methacrylate and tetramethylammonium salt of methacrylic acid; a polymer having a nitrogen atom in the side chain, such as copolymer of styrene and vinylpyridine; and a polymer having an ammonium group in the side chain, such as copolymer of butyl methacrylate and N-(2-methacryloyloxyethyl)-N,N,N-trimethylammonium tosylate. In particular, from the standpoint of stably holding the electric charge for a long time, a polymer charge-control agent is preferably used in the present invention. The electric charge imparted to the particle may be a positive charge or a negative charge.

In view of the electric charge amount of particle for the ejection, the amount of the charge-control agent added is preferably from 0.0001 to 10 mass %, more preferably from 0.001 to 5 mass %, based on the entire amount of the ink composition.

(Other Components)

In the present invention, for example, an antiseptic for preventing putrefaction and a surfactant for controlling the surface tension can be further incorporated according to the purpose.

(Physical Values of Ink Composition)

The ink composition prepared as above is used for the recording on a recording medium by an inkjet recording system. In the present invention, in order to always stably eject an ink droplet at the inkjet recording for a long time, an ink composition satisfying all of the following conditions (A) to (D) is preferably used.

(A) The electric conductivity at 20° C. of the ink composition is from 10 to 300 nS/m.

(B) The electric conductivity of the charged particle is 50% or more of the electric conductivity of the ink composition.

(C) The volume average particle diameter of the charged particles is from 0.2 to 5.0 μm.

(D) The viscosity at 20° C. of the ink composition is from 0.5 to 5 mPa·s.

The electric conductivity at 20° C. of the ink composition is preferably from 10 to 300 nS/m. When the electric conductivity of the ink composition is 10 nS/m or more, good ejection of an ink droplet can be obtained, and when it is 300 nS/m or less, electric conduction is achieved at the head (ejection part) of an inkjet apparatus and the head is not damaged. The electric conductivity of the ink composition is more preferably from 30 to 200 nS/m.

The electric conductivity of particle is a value obtained by centrifuging the ink composition, measuring the electric conductivity of the supernatant after precipitation of particles, and subtracting the measured value from the electric conductivity of the ink composition.

In the present invention, the electric conductivity of particle is preferably 50% or more of the electric conductivity of the ink composition. In the inkjet recording system utilizing an electrostatic field, concentration of charged particles occurs at the ejection of an ink droplet, but when the electric conductivity of particle is 50% or more, this concentration does not take place, as a result, bleeding of ink recorded on a recording medium is not brought about. The electric conductivity of particle is more preferably 60% or more.

The electric charge amount of the particle is preferably from 5 to 200 μC/g. When the electric charge amount is 5 μC/g or more, satisfactory concentration is obtained, and when it is 200 μC/g or less, excessive concentration does not occur and ink clogging at the ejection port of the head can be prevented. The electric charge amount of the particle is more preferably from 10 to 150 ΩC/g, still more preferably from 15 to 100 μC/g.

The volume average particle diameter of particles can be measured, for example, by a centrifugal precipitation method using a device such as ultracentrifugal automatic particle analyzer CAPA-700 (manufactured by Horiba Ltd.). The average diameter includes a volume average diameter, a number average diameter and the like according to the calculation method, but in the present invention, the volume average particle diameter of the charged particles is preferably from 0.2 to 5.0 μm. When the volume average particle diameter is 0.2 μm or more, satisfactory concentration of particles is obtained, as a result, the ink recorded on a recording medium can be prevented from bleeding, and when it is 5.0 μm or less, a problem of clogging at the ejection port of head does not arise. The volume average particle diameter is more preferably from 0.3 to 3.0 μm. The particle size distribution is preferably narrow and uniform.

In the present invention, the viscosity of the ink composition is preferably from 0.5 to 5 mPa·s. When the viscosity is 0.5 mPa·s or more, a problem that the ink composition drips from the ink ejection port of the head is not caused, and when it is 5 mPa·s or less, good ejection of an ink droplet is obtained. The viscosity is more preferably from 0.8 to 4 mPa·s.

The surface tension of the ink composition is preferably from 10 to 70 mN/m. When the surface tension is 10 mN/m or more, a problem that the ink composition drips from the ink ejection port of the head is not caused, and when it is 70 mN/m or less, good ejection of an ink droplet is obtained. The surface tension is more preferably from 15 to 50 in N/m.

(Inkjet Recording Apparatus)

The above-described ink composition is used for recording an image on a recording medium by an inkjet recording system. In the present invention, an inkjet recording system utilizing an electrostatic field is preferably employed. The inkjet recording system utilizing an electrostatic field is a system where a voltage is applied between a control electrode and a back electrode on the back surface of a recording medium, as a result, the charged particles in the ink composition are concentrated at the ejection site by the electrostatic force and flown to a recording medium from the ejection site. In applying a voltage between a control electrode and a back electrode, for example, when the charged particle is positive, the control electrode serves as the positive electrode and the back electrode serves as the negative electrode. The same effect can also be obtained by electrifying the recording medium instead of applying a voltage to the back electrode.

The ink flying system includes, for example, a system of flying an ink from a needle-like tip such as injection needle and according to this system, short-time recording can be performed by using the ink composition of the present invention.

On the other hand, in a method where an ink is circulated in an ink chamber having an ejection opening and by applying a voltage to a control electrode formed in the periphery of the ejection opening, a concentrated ink droplet is caused to fly from the tip of an ink guide present in the ejection opening and having a tip facing the recording medium side, both refilling of charged particles by the circulation of ink and meniscus stability of the ejection site can be attained and therefore, the recording can be stably performed for a long time. Furthermore, in this system, the portion of the ink coming into contact with an outside air is only the ejection opening and is very small, so that evaporation of the solvent can be suppressed and the physical properties of ink can be stabilized. Therefore, this system can be suitably used in the present invention.

A constitution example of the inkjet recording apparatus to which the ink composition of the present invention is suitably applied is described below.

An apparatus of performing one-side four-color printing on a recording medium, shown in FIG. 1, is briefly described below.

The inkjet recording apparatus 1 shown in FIG. 1 comprises an ink circulating system 3 which supplies an ink to an ejection head 2 comprising ejection heads 2C, 2M, 2Y and 2K of four colors for performing the formation of a full color image and further recovers the ink from the ejection head 2, a head driver 4 for driving the ejection head 2 by the output from an external device (not shown) such as computer and RIP, and position controlling means 5. Furthermore, the inkjet recording apparatus 1 comprises a transportation belt 7 strained by three rollers 6A, 6B and 6C, transportation belt position-detecting means 8 comprising an optical sensor or the like capable of detecting the position in the cross direction of the transportation belt 7, electrostatic adsorption means 9 for holding a recording medium P on the transportation belt, and destaticizing means 10 and dynamic means 11 for separating the recording medium P from the transportation belt 7 after the completion of image formation. Upstream and downstream the transportation belt 7, a feed roller 12 and a guide 13 for feeding the recording medium P to the transportation belt 7 from a stocker (not shown), and fixing means 14 and a guide 15 for fixing the ink on the recording medium P separated and at the same time, transporting the recording medium to a discharged paper stocker are disposed. Also, in the inside of the inkjet printing apparatus 1, recording medium position-detecting means 16 is provided at the position opposing the ejection head 2 through the transportation belt 7, and a solvent recovery part for recovering solvent vapor generated from the ink composition, comprising an exhaust fan 17 and a solvent vapor adsorbent 18, is disposed so that the vapor inside the apparatus can be discharged outside the apparatus through the recovery part.

The feed roller 12 can be a known roller and is disposed to enhance the feeding ability for the recording medium. On the recording medium P, dirt, paper dust and the like are sometimes attached and these are preferably removed. The recording medium P fed by the feed roller is transported to the transportation belt 7 through the guide 13. The back surface (preferably metal back surface) of the transportation belt 7 is placed through a roller 6A. The recording medium transported is electrostatically adsorbed on the transportation belt by the electrostatic adsorption means 9. In FIG. 1, the electrostatic adsorption is performed by a scorotron charger connected to a negative high voltage power source. By the electrostatic adsorption means 9, the recording medium 9 is electrostatically adsorbed on the transportation belt 7 without floating and at the same time, the recording medium surface is uniformly electrified. In this example, the electrostatic adsorption means is used also as the electrification means for the recording medium, but the electrification means may be provided separately. The electrified recording medium P is transported to the ejection head part by the transportation belt 7 and recording signal voltages are superposed while using the electrification potential as a bias, whereby an electrostatic inkjet image is formed. The recording medium P having formed thereon an image is destaticized by the destaticizing means 10, separated from the transportation belt 7 by the dynamic means 11 and transported to the fixing part. The recording medium P separated is transferred to the image fixing means 14 and the image is fixed. The recording medium P after fixing is discharged to the discharged paper stocker (not shown) through the guide 15. This apparatus also has means for recovering solvent vapor generated from the ink composition. The recovery means comprises a solvent vapor absorbent 18 and the gas containing solvent vapor in the apparatus is introduced into the adsorbent by the exhaust fan 17 and after adsorption and recovery of the vapor, exhausted outside the apparatus. The inkjet recording apparatus is not limited to this example, but the number, shape, relative arrangement, charged polarity and the like of constituent devices such as roller and charger can be arbitrarily selected. Furthermore, the system is described here by referring to the drawing of a four-color image, but a system of drawing an image having more colors by using a light color ink or a special color ink in combination may also be employed.

The inkjet recording apparatus for use in the above-described inkjet printing method comprises an ejection head 2 and an ink circulating system 3 and furthermore, the ink circulating system 3 has an ink tank, an ink circulating device, an ink concentration-controlling device, an ink temperature-controlling device and the like. In the ink tank, a stirring device may be contained.

The ejection head 2 may be a single channel head, a multi-channel head or a full line head, and the main scanning is performed by the rotation of a transportation belt 7.

The inkjet head which is suitably used in the present invention performs an inkjet method of electrophoresing charged particles in the ink flow path to increase the ink concentration in the vicinity of the opening, and ejecting an ink droplet, where the ink droplet is ejected by an electrostatic suction force mainly ascribable to the recording medium or the counter electrode disposed on the back surface of the recording medium. Therefore, in the case where the recording medium or counter electrode is not facing the head or even if facing the head, a voltage is not applied to the recording medium or counter electrode, an ink droplet is not ejected even though a voltage is applied by mistake to the ejection electrode or vibration is applied, and the inside of the apparatus is not contaminated.

FIGS. 2 and 3 show an ejection head which is suitably used for the above-described inkjet apparatus. As shown in FIGS. 2 and 3, the inkjet head 70 comprises an electrically insulating substrate 74 constituting the top wall of an ink flow path 72 where a one-way ink flow Q is formed, and a plurality of ejection parts 76 for ejecting an ink toward a recording medium P. In all of the ejection parts 76, an ink guide part 78 for guiding an ink droplet G flown from the ink flow path 72 toward the recording medium P is provided. In the substrate 74, openings 75 each allowing for penetration of the ink guide part 78 are formed and an ink meniscus 42 is formed between the ink guide part 78 and the inner wall surface of the opening 75. The gap d between the ink guide part 78 and the recording medium P is preferably on the order of 200 to 1,000 μm. The ink guide part 78 is fixed at its lower end side to a supporting rod part 40.

The substrate 74 has an insuating layer 44 for separating two ejection electrodes at a predetermined distance and thereby establishing electrical insulation, a first ejection electrode 46 formed on the top side of the insulating layer 44, an insulating layer 48 covering the first ejection electrode 46, a guard electrode 50 formed on the top side of the insulating layer 48, and an insulating layer 52 covering the guard electrode 50. Furthermore, the substrate 74 has a second ejection electrode 56 formed on the bottom side of the insulating layer 44, and an insulating layer 58 covering the second ejection electrode 56. The guard electrode 50 is provided to prevent adjacent ejection parts from being affected in view of electric field by the voltage applied to the first ejection electrode 46 or the second ejection electrode 56.

Furthermore, the inkjet head 70 comprises a floating conductive plate 62 provided in the electrically floating state to constitute the bottom surface of the ink flow path 72 and at the same time, drift positively charged ink particles (charged particles) R in the ink flow path 72 toward the upper side (namely, toward the recording medium side) by using an induced voltage constantly generated due to the pulsed ejection voltage applied to the first ejection electrode 46 and the second ejection electrode 56. On the surface of the floating conductive plate 62, an electrically insulating cover film 64 is formed to prevent the ink from becoming unstable in the physical properties or components as a result of, for example, injection of electric charge into the ink. The electric resistance of the insulating cover film is preferably $10^{12}$ Ω·cm or more, more preferably $10^{13}$ Ω·cm or more. Also, the insulating cover film is preferably corrosion-resistant against ink so as to prevent the floating conductive plate 62 from corroding by the ink. The bottom side of the floating electrically conducing plate 62 is covered with an insulating member 66 and by virtue of such a constitution, the floating conductive plate 62 is completely in an electrically insulated state.

One or more floating conductive plate 62 is provided per one head unit (for example, when C, M, Y and K four heads are present, each head has at least one floating conductive plate and a floating conductive plate is not commonly used between C and M head units).

For flying an ink from the inkjet head 70 as shown in FIG. 3 to record an image on the recording medium P, an ink flow Q is generated by circulating the ink in the ink flow path 72 and in this state, a predetermined voltage (for example, +100 V) is applied to the guard electrode 50. Also, a positive voltage is applied to the first ejection electrode 46, the second ejection electrode 56 and the recording medium P such that a flying electric field high enough to cause a positively charged particle R in the ink droplet G guided by the ink guide part 78 and flown from the opening 75 to gravitate to the recording medium P is formed between the first ejection electrode 46 and the recording medium P and between the second ejection electrode 56 and the recording medium P (as a standard, to form a potential difference of approximately from 1 to 3.0 kV when the gap d is 500 μm).

In this state, when a pulse voltage is applied to the first ejection electrode 46 and the second ejection electrode 56 according to image signals, the ink droplet G elevated in the charged particle concentration is ejected from the opening 75 (for example, when the initial concentration of charged particles is from 3 to 15%, the charged particle concentration in the ink droplet G becomes 30% or more).

At this time, the voltage value applied to the first ejection electrode 46 and the second ejection electrode 56 is adjusted such that the ink droplet G is ejected only when a pulse voltage is applied to both the first ejection electrode 46 and the second ejection electrode 56.

In this way, when a pulsed positive voltage is applied, the ink droplet G guided by the ink guide part 78 is flown from the opening 75 and attached to the recording medium P and at the same time, a positive induced voltage is generated in the floating conductive plate 62 due to the positive voltage applied to the first ejection electrode 46 and the second ejection electrode 56. Even when the voltage applied to the first ejection electrode 46 and the second ejection electrode 56 is pulsed, the induced voltage is nearly a stationary voltage. Accordingly, the charged particles R positively charged in the ink flow path 72 are moved upward by the force of the electric field formed between the floating conductive plate 62 and the recording medium P and between the guard electrode 50 and the recording medium P, and the concentration of charged particles R increases in the vicinity of the substrate 74. As shown in FIG. 3, when a large number of ejection parts (that is, channels for ejecting an ink droplet) are used, the number of charged particles necessary for the ejection becomes large, but since the first ejection electrode 46 and the second ejection electrode 56 each is increased in the number of sheets used, the induced voltage generated in the floating conductive plate 62 is elevated and the number of charged particles R moving to the recording medium side increases.

In the example described above, the colored particle is positively charged, but the colored particle may be negatively charged and in this case, the charged polarities all are reversed.

In the present invention, the ink ejected on a recording medium is preferably fixed by appropriate heating means. Examples of the heating means which can be used include a contact-type heating device such as heat roller, heat block and belt heating, and a non-contact type heating device such as drier, infrared lamp, visible light lamp, ultraviolet lamp and hot air-type oven. Such a heating device is preferably continued to and integrated with the inkjet recording apparatus. The temperature of the recording medium at the fixing is preferably from 40 to 200° C. in view of easiness of fixing. The fixing time is preferably from 1 micro-second to 20 seconds.

(Replenishment of Ink Composition)

In the inkjet recording system utilizing an electrostatic field, the charged particles in the ink composition are concentrated and ejected. Accordingly, when the ink is ejected for a long period of time, the amount of charged particles in the ink composition decreases and the electric conductivity of the ink composition decreases. Also, the ratio between the electric conductivity of the charged particle and the electric conductivity of the ink composition changes. Furthermore, at the ejection, a charged particle having a large diameter tends to be more preferentially ejected than a charged particle having a small diameter and therefore, the average diameter of charged particles becomes small. In addition, the content of solid matters in the ink composition varies and therefore, the viscosity is also changed. As a result of these changes in the physical values, ejection failure may occur and the recorded image may decrease in the optical density or generate bleeding of the ink. To cope with this, an ink composition having a higher concentration (the solid content concentration is higher) than the ink composition initially charged into the ink tank is replenished, whereby reduction in the amount of charged particles can be prevented and the electric conductivity of the ink composition as well as the ratio of the electric conductivity of the charged particle to the electric conductivity of the ink composition can be kept constant. Also, the average particle diameter and the viscosity can be maintained. Furthermore, by keeping constant the physical values of the ink composition, the ink is stably and uniformly ejected for a long time. The replenishment at this time is preferably performed mechanically or manually, for example, by detecting the physical values of the ink solution on use, such as electric conductivity and optical density, and calculating the shortfall. Also, the replenishment may be performed mechanically or manually by calculating the amount of the ink composition used, based on the image data.

(Recording Medium)

In the present invention, various recording mediums can be used according to uses. For example, when paper, plastic film, metal, paper laminated or vapor-deposited with plastic or metal, or plastic film laminated or vapor-deposited with metal is used, a printed matter can be directly obtained by the inkjet recording. The recording medium may have a planar shape such as sheet form or may have a steric shape such as cylindrical form.

(Fixing)

In the present invention, the ink ejected on a recording medium is preferably fixed by appropriate heating means. Examples of the heating means which can be used include a contact-type heating device such as heat roller, heat block and belt heating, and a non-contact type heating device such as drier, infrared lamp, visible light lamp, ultraviolet lamp and hot air-type oven. Such a heating device is preferably continued to and integrated with the inkjet recording apparatus.

By using the above composition of the present invention, an ink droplet can be ejected stably for a long time. Furthermore, by using the above-described inkjet recording apparatus, a high-quality image-recorded material with high image density and no bleeding of ink can be obtained over a long time. The factor bringing about these effects is not clearly known, but it is considered that when a graft polymer is used as the dispersant, the particles are stably present without undergoing aggregation due to shear stress or concentration generated on the inner wall of head at the ejection of ink. As another factor considered, the graft polymer for use in the present invention has high adsorption force to a covering or a coloring material and at the same time, has high dissolving ability in a dispersion medium. In addition, when image-recorded materials (printed matters) after inkjet recording and fixing are superposed one on another, blocking can be prevented. The factor contributing to this effect is also not clearly known, but the effect is considered to be brought about because the graft polymer for use in the present invention has high affinity for a particle and at the same time, exhibits low affinity for the back surface before image formation.

EXAMPLES

The present invention is described in greater detail below by referring to Examples, but the present invention is not limited thereto.

Synthesis Example 1

Synthesis of Graft Polymer P-4)

Stearyl methacrylate was radical-polymerized in the presence of mercaptopropionic acid to obtain a carboxylic acid-terminated polymer. The obtained polymer was reacted with hydroxyethyl methacrylate by using dicyclohexyl-carbodiimide as the condensing agent to obtain a polymer of stearyl methacrylate having a methacryloyl group at the terminal. The mass average molecular weight was 10,000. Subsequently, 55 parts by mass of this polymer and 45 parts by mass of p-acetoxystyrene were radical-polymerized to obtain Graft Polymer P-4. The mass average molecular weight was 65,000.

Other graft polymers exemplified above can also be synthesized in the same manner by changing the combination of corresponding monomers.

<Evaluation 1 of Coloring Material-Dispersing Property>

10 Parts by mass of Linol Blue FG-7350 (Pigment Blue 15:3, produced by Toyo Ink Mfg. Co., Ltd.) as the pigment, 80 parts by mass of Isopar G, and 25 parts by mass of a 20 mass % solution prepared by dissolving Graft Polymer P-4 under heat in Isopar G were pre-dispersed together with 350 parts by mass of 3G-X glass beads in a paint shaker (manufactured by Toyo Seiki Co., Ltd.) and then wet-dispersed for 5 hours in Dyno-Mill Model KDL (manufactured by Shinmaru Enterprise K.K.) at 2,000 rpm while controlling the temperature of the liquid dispersion at 30° C. by using a constant temperature bath NESLAB RTE7 (manufactured by M&S Instruments Inc.). After the completion of dispersion, the volume average particle diameter of pigment resin particles in the liquid dispersion was measured by an ultracentrifugal automatic particle analyzer CAPA-700 (manufactured by Horiba Ltd.) and found to be 1.3 µm. The dispersion was further continued, but the volume average particle diameter was not decreased any more and this reveals that the pigment could not be dispersed.

<Evaluation 2 of Coloring Material-Dispersing Property>

Dispersion of a pigment was performed in the same manner as in Evaluation 1 of Coloring Material-Dispersing Property except that carbon black (MA100, produced by Mitsubishi Chemical Corp.), which is a black pigment, was used as the pigment in place of Linol Blue FG-7350 and Graft Polymer P-7 was used in place of Graft Polymer P-4. The volume average particle diameter was 1.2 µm. The dispersion was further continued, but the volume average particle diameter was not decreased any more and this reveals that the pigment could not be dispersed.

<Evaluation 3 of Coloring Material-Dispersing Property>

Dispersion of a pigment was performed in the same manner as in Evaluation 1 of Coloring Material-Dispersing Property except that monoazo lake pigment C.I. Pigment Red (57:1) (Symuler Brilliant Carmine 6B229, produced by Dai-Nippon Ink & Chemicals, Inc.), which is a magenta pigment, was used as the pigment in place of Linol Blue FG-7350 and Graft Polymer P-11 was used in place of Graft Polymer P-4. The volume average particle diameter was 1.2 µm. The dispersion was further continued, but the volume average particle diameter was not decreased any more and this reveals that the pigment could not be dispersed.

<Evaluation 4 of Coloring Material-Dispersing Property>

Dispersion of a pigment was performed in the same manner as in Evaluation 1 of Coloring Material-Dispersing Property except that disazo pigment C.I. Pigment Yellow 180 (Toner Y HG, produced by Clariant Co.), which is a yellow pigment, was used as the pigment in place of Linol Blue FG-7350 and Graft Polymer P-12 was used in place of Graft Polymer P-4. The volume average particle diameter was 1.3 µm. The dispersion was further continued, but the volume average particle diameter was not decreased any more and this reveals that the pigment could not be dispersed.

Example 1

Ink Composition IJ-1

100 Parts by mass of Linol Blue FG-7350 (Pigment Blue 15:3, produced by Toyo Ink Mfg. Co., Ltd.) as a blue pigment and 200 parts by mass of a methyl methacrylate/butyl methacrylate/stearyl methacrylate/trimethylammoniumethyl methacrylate (anion: p-toluenesulfonate ion) copolymer (38/47/10/5 by mass; mass average molecular weight: 10,000; glass transition point Tg: 40° C.) as the resin were preliminarily pulverized and thoroughly mixed in a trio-blender and then melt-kneaded (120 minutes) in a desktop kneader PBV (manufactured by Irie Shokai K.K.) heated at 100° C. to provide a colored mixture. This pigment-kneaded product (colored mixture) was pulverized in a pin mill. Subsequently, 10 parts by mass of the pulverized pigment kneaded product, 80 parts by mass of Isopar G and 12.5 parts by mass of a 20 mass % solution prepared by dissolving under heat Graft Polymer P-4 in Isopar G were pre-dispersed together with 350 parts by mass of 3G-X glass beads in a paint shaker (manufactured by Toyo Seiki Co., Ltd.) for 30 minutes, then wet-dispersed for 4 hours in Dyno-Mill Model KDL (manufactured by Shinmaru Enterprise K.K.) at 2,000 rpm while controlling the temperature of the liquid dispersion at 30° C. by using a constant temperature bath NESLAB RTE7 (manufactured by M&S Instruments Inc.) and after elevating the temperature to 60° C., further wet-dispersed for 2 hours. After the completion of dispersion, the volume average particle diameter of pigment resin particles (coloring material covered with a resin insoluble in a non-aqueous solvent) in the liquid dispersion was measured by an ultracentrifugal automatic particle analyzer CAPA-700 (manufactured by Horiba Ltd.) and found to be 1.02 μm. The proportion of fine particles of 0.2 μm or less was 0.2% on the volume basis. The liquid dispersion was observed by a scanning electron microscope, as a result, microfine pigment particles were not observed.

After removing glass beads by filtration, 0.2 g of an octadecene-half maleic acid octadecylamide copolymer was added thereto as a charge-control agent and the resulting liquid dispersion of pigment resin particles was diluted with Isopar G such that the pigment resin particle component became 7.0%. In this way, Ink Composition IJ-1 was prepared.

The physical values of Ink Composition IJ-1 were as follows.

The electric conductivity at 20° C. of the ink composition was measured by using an LCR meter (AG-4311, manufactured by Ando Electronic Co., Ltd.) and an electrode for liquid (Model LP-05, manufactured by Kawaguchi Electric Works Co., Ltd.) under the conditions that the applied voltage was 5 V and the frequency was 1 kHz, and found to be 150 nS/m.

The ink composition was subjected to centrifugal separation using a small high-speed cooling centrifuge (SRX-201, manufactured by Tomy Seiko Co., Ltd.) for 30 minutes under the conditions that the rotation number was 14,500 rpm and the temperature was 20° C., thereby precipitating charged particles, and then the electric conductivity of the supernatant was measured and found to be 35 nS/m. The electric conductivity of the charged particle was 105 nS/m corresponding to 70% of the electric conductivity of the ink composition. The electric charge of the charged particle was positive.

The viscosity at 20° C. of the ink composition was measured by a E-type viscometer manufactured by Tokyo Keiki Co., Ltd. and found to be 1.5 mPa·s. Also, the surface tension at 20° C. of the ink composition was measured by an automatic tensiometer FACE manufactured by Kyowa Interface Science Co., Ltd. and found to be 24 mN/m. Furthermore, after the ink composition was stored for 2 weeks under the condition of 45° C., fluctuation in the physical properties of the ink was not caused.

<Inkjet Recording>

Ink Composition IJ-1 was filled in the ink tank connected to the head of the inkjet recording apparatus shown in FIGS. 1 to 3. The ejection head used here was a 150-dpi (stagger arrangement in three arrays with a channel density of 50 dpi) 833channel head of the type shown in FIG. 2, and the fixing means used was a silicon rubber-made heat roller self-containing a heater of 1 kW. As the ink temperature-controlling means, an immersion heater and a stirring blade were provided in the ink tank and by setting the ink temperature to 30° C., the temperature was controlled with a thermostat while rotating the stirring blade at 30 rpm. The stirring blade was used here to serve also as the stirring means for preventing precipitation and aggregation. A part of the ink flow path was made transparent, and an LED light-emitting device and a light-detecting device were disposed to sandwich the transparent portion. Based on the output signal therefrom, the concentration was controlled by charging a diluting solution (Isopar G) for ink or a concentrated ink (prepared by adjusting the solid content concentration of the ink composition prepared above to a 3-fold concentration). The recording medium used was a slightly coated paper sheet for offset printing. After removing dusts on the surface of the recording medium by air pump suction, the ejection head was approximated to the recording medium until the image-forming position. Then, the image data to be recorded were transmitted to the image data arithmetic and control part and the ink composition was ejected by sequentially moving the ejection head while transporting the recording medium by the rotation of the transportation belt, thereby forming an image with an image drawing resolution of 2,400 dpi. The transportation belt used here was obtained by laminating a metal belt and a polyimide film. In the vicinity of one edge of this belt, a linear marker was disposed along the transportation direction and while optically reading this marker by the transportation belt position-detecting means and driving the position-controlling means, the image was formed. At this time, the distance between the ejection head and the recording medium was kept to 0.5 mm according to the from an optical gap-detecting device. The surface potential of the recording medium at the ejection was set to −1.5 kV and in performing the ejection, a pulse voltage of +450 V was applied (pulse width: 50 μsec) and the image was formed at a driving frequency of 15 kHz. Immediately after the image recording, the image was fixed by using a heat roller. At the fixing, the temperature of the coated paper was 90° C. and the contact time with the heat roller was 0.3 seconds.

On the image-recorded material (printed matter) obtained, streaked unevenness or bleeding of ink was not observed and a very clear image was formed. Also, image formation failure and the like were not generated at all and the image was completely free from deterioration due to change in the dot size or the like even when the ambient temperature was changed or the recording time was increased. After the completion of recording, the inkjet recording apparatus was retreated to 50 mm from the position close to the transportation belt so as to protect the inkjet head. Also, after the completion of recording, the head was cleaned by supplying Isopar G in place of ink for 10 minutes and then, the head was housed in a cover filled with vapor of Isopar G, as a result, the head and pipeline were prevented from adhesion of the pigment and a good image-recorded material could be produced for 1 month without requiring a maintenance operation.

Example 2

Ink Composition IJ-2

An ink composition was produced in the same manner as in Example 1 except that in the production of Ink Composition IJ-1 in Example 1, carbon black (MA100, produced by Mitsubishi Chemical Corp.) as a black pigment was used in place of Linol Blue FG-7350 and Graft Polymer P-7 was used in place of Graft Polymer P-4. The volume average particle diameter of pigment resin particles in the ink composition was 1.1 μm. Also, the proportion of fine particles of 0.2 μm or less was 0.1% on the volume basis. The liquid dispersion was observed by a scanning electron microscope, as a result, microfine pigment particles were not observed.

The physical values of Ink Composition IJ-2 were measured by the same methods under the same conditions as in Example 1. The results obtained were as follows.

Electric conductivity at 20° C. of ink composition: 140 nS/m

Electric conductivity of supernatant of ink composition: 49 nS/m

Electric conductivity of charged particle in ink composition: 91 nS/m (corresponding to 65% of the electric conductivity of ink composition)

Electric charge of charged particle: positive

Viscosity at 20° C. of ink composition: 1.4 mPa·s

Surface tension at 20° C. of ink composition: 24 mN/m

Also, after the ink composition was stored for 2 weeks under the condition of 45° C., fluctuation in the physical properties of the ink was not caused.

Furthermore, inkjet recording was performed in the same manner as in Example 1 by using Ink Composition IJ-2, as a result, on the image-recorded material (printed matter) obtained, streaked unevenness or bleeding of ink was not observed and a very clear image was formed. Also, image formation failure and the like were not generated at all and the image was completely free from deterioration due to change in the dot size or the like even when the ambient temperature was changed or the recording time was increased. In addition, the head and pipeline were prevented from adhesion of the pigment and a good image-recorded material could be produced for 1 month without requiring a maintenance operation.

Example 3

Ink Composition IJ-3

An ink composition was produced in the same manner as in Example 1 except that in the production of Ink Composition IJ-1 in Example 1, monoazo lake pigment C.I. Pigment Red (57:1) (Symuler Brilliant Carmine 6B229, produced by Dai-Nippon Ink & Chemicals, Inc.) as a magenta pigment was used in place of Linol Blue FG-7350 and Graft Polymer P-11 was used in place of Graft Polymer P-4. The volume average particle diameter of pigment resin particles in the ink composition was 1.1 μm. Also, the proportion of fine particles of 0.2 μm or less was 0.1% on the volume basis. The liquid dispersion was observed by a scanning electron microscope, as a result, microfine pigment particles were not observed.

The physical values of Ink Composition IJ-3 were measured by the same methods under the same conditions as in Example 1. The results obtained were as follows.

Electric conductivity at 20° C. of ink composition: 160 nS/m

Electric conductivity of supernatant of ink composition: 48 nS/m

Electric conductivity of charged particle in ink composition: 112 nS/m (corresponding to 70% of the electric conductivity of ink composition)

Electric charge of charged particle: positive

Viscosity at 20° C. of ink composition: 1.5 mPa·s

Surface tension at 20° C. of ink composition: 25 mN/m

Also, after the ink composition was stored for 2 weeks under the condition of 45° C., fluctuation in the physical properties of the ink was not caused.

Furthermore, inkjet recording was performed in the same manner as in Example 1 by using Ink Composition IJ-3, as a result, on the image-recorded material (printed matter) obtained, streaked unevenness or bleeding of ink was not observed and a very clear image was formed. Also, image formation failure and the like were not generated at all and the image was completely free from deterioration due to change in the dot size or the like even when the ambient temperature was changed or the recording time was increased. In addition, the head and pipeline were prevented from adhesion of the pigment and a good image-recorded material could be produced for 1 month without requiring a maintenance operation.

Example 4

Ink Composition IJ-4

An ink composition was produced in the same manner as in Example 1 except that in the production of Ink Composition IJ-1 in Example 1, disazo pigment C.I. Pigment Yellow 180 (Toner Y HG, produced by Clariant Co.) as a yellow pigment was used in place of Linol Blue FG-7350 and Graft Polymer P-12 was used in place of Graft Polymer P-4. The volume average particle diameter of pigment resin particles in the ink composition was 1.06 μm. Also, the proportion of fine particles of 0.2 μm or less was 0.2% on the volume basis. The liquid dispersion was observed=by a scanning electron microscope, as a result, microfine pigment particles were not observed.

The physical values of Ink Composition IJ-4 were measured by the same methods under the same conditions as in Example 1. The results obtained were as follows.

Electric conductivity at 20° C. of ink composition: 150 nS/m

Electric conductivity of supernatant of ink composition: 48 nS/m

Electric conductivity of charged particle in ink composition: 102 nS/m (corresponding to 68% of the electric conductivity of ink composition)

Electric charge of charged particle: positive

Viscosity at 20° C. of ink composition: 1.5 mPa·s

Surface tension at 20° C. of ink composition: 24 mN/m

Also, after the ink composition was stored for 2 weeks under the condition of 45° C., fluctuation in the physical properties of the ink was not caused.

Furthermore, inkjet recording was performed in the same manner as in Example 1 by using Ink Composition IJ-4, as a result, on the image-recorded material (printed matter) obtained, streaked unevenness or bleeding of ink was not observed and a very clear image was formed. Also, image formation failure and the like were not generated at all and the image was completely free from deterioration due to change in the dot size or the like even when the ambient temperature was changed or the recording time was increased. In addition, the head and pipeline were prevented from adhesion of the pigment and a good image-recorded material could be produced for 1 month without requiring a maintenance operation.

While the invention has been described in detail and with reference to specific embodiments thereof, it will be apparent to one skilled in the art that various changes and modifications can be made therein without departing from the spirit and scope thereof.

The present application claims foreign priority based on Japanese Patent Application No. JP2004-376981, filed Dec. 27, 2004, the contents of which is incorporated herein by reference.

What is claimed is:

1. A process for producing an inkjet ink composition, which comprises dispersing a coloring material in a non-aqueous solvent with a dispersant having no coloring material-dispersing property, the coloring material being covered with a resin insoluble in the non-aqueous solvent, wherein the dispersant is a graft polymer comprising a repeating unit of formula (1) in a main chain of the graft polymer:

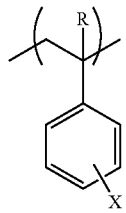

wherein R represents a hydrogen atom or a methyl group; X represents a halogen atom, $OR^1$, $-COOR^1$, $-CON(R^1)(R^2)$ or $-OCOR^1$; $R^1$ represents an organic group having a carbon number of 1 to 10; and $R^2$ represents a hydrogen atom or an organic group having a carbon number of 1 to 10.

2. The process for producing an inkjet ink composition according to claim 1, wherein the dispersing is performed at a temperature higher than a glass transition point of the resin insoluble in the non-aqueous solvent.

3. The process for producing an inkjet ink composition according to claim 1, wherein the inkjet ink composition is an electrostatic-inkjet ink composition.

4. An inkjet ink composition comprising: a non-aqueous solvent; a coloring material covered with a resin insoluble in the non-aqueous solvent; and a dispersant having no coloring material-dispersing property, wherein the dispersant is a graft polymer comprising a repeating unit of formula (1) in a main chain of the graft polymer:

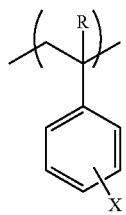

wherein R represents a hydrogen atom or a methyl group; X represents a halogen atom, $OR^1$, $-COOR^1$, $-CON(R^1)(R^2)$ or $-OCOR^1$; $R^1$ represents an organic group having a carbon number of 1 to 10; and $R^2$ represents a hydrogen atom or an organic group having a carbon number of 1 to 10.

5. The inkjet ink composition according to claim 4, wherein the graft polymer has a weight-average molecular weight of 1,000 or more, and the graft polymer further comprises a repeating unit of formula (2):

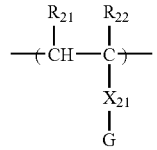

wherein $R_{21}$ and $R_{22}$ each independently represents a hydrogen atom or a methyl group; $X_{21}$ represents a single bond or a divalent linking group comprising two or more atoms selected from the group consisting of C, H, N, O, S and P, the divalent group having a total atom number of 50 or less; and G represents a polymer component having a weight-average molecular weight of 500 or more, the polymer comprising a repeating of formula (3), or a polydimethylsiloxane group having a weight-average molecular weight of 500 or more:

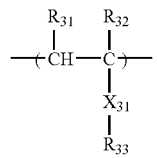

wherein $R_{31}$ and $R_{32}$ each represents a hydrogen atom or a methyl group; $R_x$ represents a hydrogen atom or a hydrocarbon group having a carbon number of 1 to 30; and $X_{31}$ represents a single bond or a divalent linking group comprising two or more atoms selected from the group consisting of C, H, N, O, S and P, the divalent group having a total atom number of 50 or less.

6. The inkjet ink composition according to claim 4, which has a proportion of the coloring material having an average particle diameter of 0.2 μm or less of 5% or less by volume.

7. The inkjet ink composition according to claim 4, which is an electrostatic-inkjet ink composition.

* * * * *